（12）United States Patent
Kobayashi

(10) Patent No.: US 8,788,716 B2
(45) Date of Patent: Jul. 22, 2014

(54) WIRELESS MULTIMEDIA TRANSPORT METHOD AND APPARATUS

(75) Inventor: Osamu Kobayashi, Los Altos, CA (US)

(73) Assignee: STMicroelectronics, Inc., Coppell, TX (US)

( * ) Notice: Subject to any disclaimer, the term of this patent is extended or adjusted under 35 U.S.C. 154(b) by 299 days.

(21) Appl. No.: 13/415,394

(22) Filed: Mar. 8, 2012

(65) Prior Publication Data

US 2012/0163188 A1 Jun. 28, 2012

Related U.S. Application Data

(62) Division of application No. 12/767,429, filed on Apr. 26, 2010, now Pat. No. 8,156,238.

(60) Provisional application No. 61/177,977, filed on May 13, 2009.

(51) Int. Cl.
*G06F 15/16* (2006.01)
*H04L 29/06* (2006.01)
*G06F 12/00* (2006.01)

(52) U.S. Cl.
CPC .............. *H04L 65/4092* (2013.01); *H04L 65/80* (2013.01); *H04L 65/602* (2013.01)
USPC .......................................... 709/250; 709/226

(58) Field of Classification Search
USPC ................. 709/203, 217–218, 223–229, 250
See application file for complete search history.

(56) References Cited

U.S. PATENT DOCUMENTS

| 4,479,142 | A | 10/1984 | Buschman et al. |
| 4,796,203 | A | 1/1989 | Roberts |
| 4,868,557 | A | 9/1989 | Perlman |
| 5,007,050 | A | 4/1991 | Kasparian et al. |
| 5,245,612 | A | 9/1993 | Kachi et al. |
| 5,258,983 | A | 11/1993 | Lane et al. |
| 5,369,775 | A | 11/1994 | Yamasaki et al. |
| 5,425,101 | A | 6/1995 | Woo et al. |
| 5,515,296 | A | 5/1996 | Agarwal |
| 5,541,919 | A | 7/1996 | Yong et al. |

(Continued)

FOREIGN PATENT DOCUMENTS

| CN | 1353513 | 6/2002 |
| EP | 0 354 480 A | 2/1990 |

(Continued)

OTHER PUBLICATIONS

Notice of Allowance dated Dec. 5, 2011 from U.S. Appl. No. 12/767,429.

(Continued)

*Primary Examiner* — Zarni Maung
(74) *Attorney, Agent, or Firm* — Beyer Law Group LLP

(57) ABSTRACT

Apparatus and methods for wireless data transmission in a multimedia network are disclosed. Disclosed is a network having a source coupled to a sink using a virtual channel that includes a wireless communication channel. A source end of the system provides a packetizing data stream having a stream of payloads such that each payload is associated with its respective originating source stream. The system configured to encode the packetized data stream for wireless transport. A non-wireless source end of the system receives quality of service information from downstream. Thereby enabling adjustments to the source content and packetized data streams.

47 Claims, 6 Drawing Sheets

(56) References Cited

U.S. PATENT DOCUMENTS

| | | |
|---|---|---|
| 5,608,418 A | 3/1997 | McNally |
| 5,615,376 A | 3/1997 | Ranganathan |
| 5,625,379 A | 4/1997 | Reinert et al. |
| 5,629,715 A | 5/1997 | Zenda |
| 5,670,973 A | 9/1997 | Bassetti, Jr. et al. |
| 5,739,803 A | 4/1998 | Neugebauer |
| 5,745,837 A | 4/1998 | Fuhrmann |
| 5,790,083 A | 8/1998 | Bassetti |
| 5,801,776 A | 9/1998 | Tamura et al. |
| 5,805,173 A | 9/1998 | Glennon et al. |
| 5,835,498 A | 11/1998 | Kim et al. |
| 5,835,730 A | 11/1998 | Grossman et al. |
| 5,838,875 A | 11/1998 | Cho et al. |
| 5,852,630 A | 12/1998 | Langberg et al. |
| 5,887,039 A | 3/1999 | Suemura et al. |
| 5,909,465 A | 6/1999 | Bottomley et al. |
| 5,918,002 A | 6/1999 | Klemets et al. |
| 5,926,155 A | 7/1999 | Arai et al. |
| 5,940,070 A | 8/1999 | Koo |
| 5,940,137 A | 8/1999 | Hulvey |
| 5,949,437 A | 9/1999 | Clark |
| 6,005,613 A | 12/1999 | Endsley et al. |
| 6,005,861 A | 12/1999 | Humpleman |
| 6,020,901 A | 2/2000 | Lavelle et al. |
| 6,026,179 A | 2/2000 | Brett |
| 6,038,000 A | 3/2000 | Hurst, Jr. |
| 6,049,316 A | 4/2000 | Nolan et al. |
| 6,049,769 A | 4/2000 | Holmes et al. |
| 6,069,929 A | 5/2000 | Yabe et al. |
| 6,151,334 A | 11/2000 | Kim et al. |
| 6,151,632 A | 11/2000 | Chadda et al. |
| 6,154,225 A | 11/2000 | Kou et al. |
| 6,172,988 B1 | 1/2001 | Tiernan et al. |
| 6,175,573 B1 | 1/2001 | Togo et al. |
| 6,177,922 B1 | 1/2001 | Schiefer et al. |
| 6,219,736 B1 | 4/2001 | Klingman |
| 6,223,089 B1 | 4/2001 | Page |
| 6,249,319 B1 | 6/2001 | Post |
| 6,326,961 B1 | 12/2001 | Lin et al. |
| 6,330,605 B1 | 12/2001 | Christensen et al. |
| 6,337,964 B2 | 1/2002 | Inami et al. |
| 6,353,594 B1 | 3/2002 | Tooker et al. |
| 6,356,260 B1 | 3/2002 | Montalbo |
| 6,437,768 B1 | 8/2002 | Kubota et al. |
| 6,441,857 B1 | 8/2002 | Wicker et al. |
| 6,446,130 B1 | 9/2002 | Grapes |
| 6,477,252 B1 | 11/2002 | Faber et al. |
| 6,490,705 B1 | 12/2002 | Boyce |
| 6,542,967 B1 | 4/2003 | Major |
| 6,543,053 B1 | 4/2003 | Li et al. |
| 6,545,688 B1 | 4/2003 | Loveridge et al. |
| 6,577,303 B2 | 6/2003 | Kim |
| 6,585,431 B1 | 7/2003 | Okamoto |
| 6,587,480 B1 | 7/2003 | Higgins et al. |
| 6,598,161 B1 | 7/2003 | Kluttz et al. |
| 6,600,469 B1 | 7/2003 | Nukiyama et al. |
| 6,608,828 B1 | 8/2003 | Balachandran |
| 6,614,800 B1 | 9/2003 | Genty et al. |
| 6,661,422 B1 | 12/2003 | Valmiki et al. |
| 6,693,895 B1 | 2/2004 | Crummey et al. |
| 6,697,376 B1 | 2/2004 | Son et al. |
| 6,704,310 B1 | 3/2004 | Zimmermann et al. |
| 6,765,931 B1 | 7/2004 | Rabenko et al. |
| 6,778,168 B2 | 8/2004 | Mamiya et al. |
| 6,801,711 B1 | 10/2004 | Kim et al. |
| 6,862,606 B1 | 3/2005 | Major et al. |
| 6,865,188 B1 | 3/2005 | Stirling et al. |
| 6,873,625 B1 | 3/2005 | Yoo et al. |
| 6,874,118 B1 | 3/2005 | Pirzadeh et al. |
| 6,903,716 B2 | 6/2005 | Kawabe et al. |
| 6,907,067 B1 | 6/2005 | Moeller et al. |
| 6,909,442 B2 | 6/2005 | Hiyama et al. |
| 6,914,637 B1 | 7/2005 | Wolf et al. |
| 6,963,968 B2 | 11/2005 | Kori |
| 6,973,069 B1 | 12/2005 | Spear et al. |
| 6,975,645 B1 | 12/2005 | Suzuki et al. |
| 7,006,506 B1 | 2/2006 | Naik |
| 7,046,631 B1 | 5/2006 | Giroux et al. |
| 7,075,987 B2 | 7/2006 | Kim et al. |
| 7,099,277 B2 | 8/2006 | Sahinoglu et al. |
| 7,136,415 B2 | 11/2006 | Yun et al. |
| 7,177,329 B2 | 2/2007 | Kobayashi et al. |
| 7,194,554 B1 | 3/2007 | Short et al. |
| 7,248,590 B1 | 7/2007 | Liu |
| 7,256,790 B2 | 8/2007 | Valmiki et al. |
| 7,295,578 B1 | 11/2007 | Lyle et al. |
| 7,348,957 B2 | 3/2008 | Cui et al. |
| 7,453,479 B2 | 11/2008 | Le et al. |
| 7,525,975 B2 | 4/2009 | Caspi et al. |
| 8,416,782 B2 * | 4/2013 | Kim et al. ............ 370/392 |
| 2001/0014936 A1 | 8/2001 | Jinzaki |
| 2001/0019560 A1 | 9/2001 | Yamashita |
| 2001/0030649 A1 | 10/2001 | Mamiya et al. |
| 2001/0036193 A1 | 11/2001 | Kori |
| 2001/0038387 A1 | 11/2001 | Tomooka et al. |
| 2001/0052011 A1 | 12/2001 | Nagao |
| 2002/0007452 A1 | 1/2002 | Traw et al. |
| 2002/0011996 A1 | 1/2002 | Inoue et al. |
| 2002/0033981 A1 | 3/2002 | Keller et al. |
| 2002/0036631 A1 | 3/2002 | Perez |
| 2002/0054420 A1 | 5/2002 | Fergusson |
| 2002/0060676 A1 | 5/2002 | Kim |
| 2002/0061024 A1 | 5/2002 | Malkemes et al. |
| 2002/0062394 A1 | 5/2002 | Bunn et al. |
| 2002/0071055 A1 | 6/2002 | Ooshima et al. |
| 2002/0071390 A1 | 6/2002 | Reeves et al. |
| 2002/0075250 A1 | 6/2002 | Shigeta et al. |
| 2002/0075902 A1 | 6/2002 | Abbas et al. |
| 2002/0080468 A1 | 6/2002 | Crummey et al. |
| 2002/0085582 A1 | 7/2002 | Kim |
| 2002/0089517 A1 | 7/2002 | Ludtke et al. |
| 2002/0122515 A1 | 9/2002 | Bodenschatz |
| 2002/0136219 A1 | 9/2002 | Ding et al. |
| 2002/0149617 A1 | 10/2002 | Becker |
| 2002/0163598 A1 | 11/2002 | Pasqualino |
| 2002/0164022 A1 | 11/2002 | Strasser et al. |
| 2002/0184327 A1 | 12/2002 | Major et al. |
| 2002/0190974 A1 | 12/2002 | Morita |
| 2002/0190978 A1 | 12/2002 | Agarwal et al. |
| 2002/0191625 A1 | 12/2002 | Kelly et al. |
| 2003/0035442 A1 | 2/2003 | Eng |
| 2003/0048852 A1 | 3/2003 | Hwang et al. |
| 2003/0056051 A1 | 3/2003 | Burke et al. |
| 2003/0063077 A1 | 4/2003 | Koyama |
| 2003/0067552 A1 | 4/2003 | Leyvi et al. |
| 2003/0067558 A1 | 4/2003 | Shintani et al. |
| 2003/0076282 A1 | 4/2003 | Ikeda et al. |
| 2003/0080971 A1 | 5/2003 | Hochmuth et al. |
| 2003/0112822 A1 | 6/2003 | Hong et al. |
| 2003/0138102 A1 | 7/2003 | Kohn et al. |
| 2003/0145258 A1 | 7/2003 | Warner et al. |
| 2003/0149987 A1 | 8/2003 | Pasqualino et al. |
| 2003/0152160 A1 | 8/2003 | Bauch et al. |
| 2003/0174022 A1 | 9/2003 | Zamir et al. |
| 2003/0174156 A1 | 9/2003 | Katsuhara et al. |
| 2003/0174795 A1 | 9/2003 | Bruhnke et al. |
| 2003/0177423 A1 | 9/2003 | Komatsu et al. |
| 2003/0212811 A1 | 11/2003 | Thornton |
| 2003/0220026 A1 | 11/2003 | Oki et al. |
| 2004/0022204 A1 | 2/2004 | Trembley |
| 2004/0049705 A1 | 3/2004 | Liebenow |
| 2004/0059852 A1 | 3/2004 | Sun et al. |
| 2004/0068744 A1 | 4/2004 | Claussen et al. |
| 2004/0080523 A1 | 4/2004 | Myers |
| 2004/0080671 A1 | 4/2004 | Siemens et al. |
| 2004/0081151 A1 | 4/2004 | Greis et al. |
| 2004/0088469 A1 | 5/2004 | Levy |
| 2004/0100583 A1 | 5/2004 | Yoneno |
| 2004/0103333 A1 | 5/2004 | Martwick et al. |
| 2004/0114607 A1 | 6/2004 | Shay et al. |
| 2004/0150928 A1 | 8/2004 | Goodfellow et al. |
| 2004/0179593 A1 | 9/2004 | Goldstein et al. |
| 2004/0198386 A1 | 10/2004 | Dupray |
| 2004/0199565 A1 | 10/2004 | Visharam et al. |

(56) References Cited

U.S. PATENT DOCUMENTS

| | | |
|---|---|---|
| 2004/0203383 A1 | 10/2004 | Kelton et al. |
| 2004/0207625 A1 | 10/2004 | Griffin et al. |
| 2004/0210805 A1 | 10/2004 | Kimelman et al. |
| 2004/0218598 A1 | 11/2004 | Kobayashi |
| 2004/0218599 A1 | 11/2004 | Kobayashi |
| 2004/0218624 A1 | 11/2004 | Kobayashi |
| 2004/0218625 A1 | 11/2004 | Kobayashi |
| 2004/0218627 A1 | 11/2004 | Kobayashi |
| 2004/0221056 A1 | 11/2004 | Kobayashi |
| 2004/0221180 A1 | 11/2004 | Enami et al. |
| 2004/0221312 A1 | 11/2004 | Kobayashi |
| 2004/0221315 A1 | 11/2004 | Kobayashi |
| 2004/0228365 A1 | 11/2004 | Kobayashi |
| 2004/0233181 A1 | 11/2004 | Kobayashi |
| 2004/0240454 A1 | 12/2004 | Yamauchi et al. |
| 2004/0243905 A1 | 12/2004 | Merritt |
| 2005/0062699 A1 | 3/2005 | Kobayashi |
| 2005/0062711 A1 | 3/2005 | Kobayashi |
| 2005/0066085 A1 | 3/2005 | Kobayashi |
| 2005/0103333 A1 | 5/2005 | Bonutti |
| 2005/0157714 A1 | 7/2005 | Shlissel et al. |
| 2005/0204077 A1 | 9/2005 | Kou |
| 2005/0216731 A1 | 9/2005 | Saito et al. |
| 2005/0225547 A1 | 10/2005 | Choi |
| 2005/0249212 A1 | 11/2005 | Schoner |
| 2006/0015299 A1 | 1/2006 | McDermott et al. |
| 2006/0036788 A1 | 2/2006 | Galang et al. |
| 2006/0059092 A1 | 3/2006 | Burshan et al. |
| 2006/0117371 A1 | 6/2006 | Margulis |
| 2006/0133386 A1 | 6/2006 | McCormack et al. |
| 2006/0209890 A1 | 9/2006 | MacMullan et al. |
| 2006/0258216 A1 | 11/2006 | Konda |
| 2006/0271979 A1 | 11/2006 | Hejna, Jr. |
| 2006/0277589 A1 | 12/2006 | Margis et al. |
| 2007/0019684 A1 | 1/2007 | Zimmermann |
| 2007/0049086 A1 | 3/2007 | Sakane |
| 2007/0091815 A1 | 4/2007 | Tinnakornsrisuphap et al. |
| 2007/0097885 A1 | 5/2007 | Traversat et al. |
| 2007/0107020 A1* | 5/2007 | Tavares ............................ 725/81 |
| 2007/0115827 A1 | 5/2007 | Boehnke et al. |
| 2007/0140298 A1 | 6/2007 | Eng |
| 2007/0299778 A1* | 12/2007 | Haveson et al. ................. 705/51 |
| 2008/0022023 A1 | 1/2008 | Kim et al. |
| 2008/0062201 A1 | 3/2008 | Bhatia et al. |
| 2008/0091439 A1 | 4/2008 | Baumgarte et al. |
| 2008/0126824 A1 | 5/2008 | Lee et al. |
| 2008/0175277 A1 | 7/2008 | Yin et al. |
| 2008/0278567 A1 | 11/2008 | Nakajima |
| 2008/0284761 A1 | 11/2008 | Knee et al. |
| 2010/0034106 A1 | 2/2010 | Hu et al. |
| 2010/0260296 A1 | 10/2010 | Chorney et al. |
| 2010/0293287 A1 | 11/2010 | Kobayashi |
| 2010/0313082 A1* | 12/2010 | Kim et al. ....................... 714/57 |
| 2013/0088641 A1* | 4/2013 | Shao et al. ..................... 348/515 |

FOREIGN PATENT DOCUMENTS

| | | |
|---|---|---|
| EP | 0 385 449 A1 | 9/1990 |
| EP | 0 674 440 A2 | 9/1995 |
| EP | 0 674 441 A1 | 9/1995 |
| EP | 078 8048 | 6/1997 |
| EP | 1 041 823 A2 | 10/2000 |
| EP | 1 069 721 A2 | 1/2001 |
| EP | 1 089 503 | 4/2001 |
| EP | 1 154 354 A | 11/2001 |
| EP | 1 229 690 A | 8/2002 |
| EP | 1 251 664 A2 | 10/2002 |
| EP | 1 432 203 | 6/2004 |
| EP | 1 473 700 | 11/2004 |
| EP | 1 517 292 A2 | 3/2005 |
| EP | 1 519 349 A2 | 3/2005 |
| EP | 1 519 581 A1 | 3/2005 |
| EP | 1 628 446 | 2/2006 |
| GB | 2 329 741 A | 3/1999 |
| JP | 03-153299 | 7/1991 |
| JP | 10145309 | 5/1998 |
| JP | 11175045 | 7/1999 |
| JP | 2001 218082 | 8/2001 |
| JP | 2001036900 | 9/2001 |
| JP | 2002 304168 | 10/2002 |
| SG | 110144 | 4/2005 |
| WO | WO95/00917 | 1/1995 |
| WO | WO95/13681 | 5/1995 |
| WO | WO98/41008 | 9/1998 |
| WO | WO99/63513 | 12/1999 |
| WO | WO00/20974 | 4/2000 |
| WO | WO02/25822 A2 | 3/2002 |
| WO | WO02/25885 | 3/2002 |
| WO | WO02/65746 | 8/2002 |
| WO | WO03/058376 | 7/2003 |

OTHER PUBLICATIONS

Final Office Action dated Feb. 23, 2011 from U.S. Appl. No. 12/610,928.
Office Action dated Nov. 29, 2010 in U.S. Appl. No. 11/740,859.
Office Action dated Nov. 26, 2010 in U.S. Appl. No. 11/776,411.
Office Action dated Nov. 30, 2010 in U.S. Appl. No. 11/747,844.
European Search Report dated Sep. 22, 2010 in EP Application No. 10162586.1.
Lei et al., "Adaptive Video Transcoding and Streaming Over Wireless Channels," The Journal of Systems and Software 75 (2005) 253-270.
Notice of Allowance dated May 21, 2010 in U.S. Appl. No. 10/909,027.
Office Action dated Jun. 23, 2010 in U.S. Appl. No. 11/776,411.
"Interfacing the Serial I/O to an I2C Peripheral", Fujitsu Microelectronics, Inc., p. 1, 4 and 7.
Office Action dated Jun. 14, 2010 in U.S. Appl. No. 11/747,844.
Office Action dated Jun. 11, 2010 in U.S. Appl. No. 11/740,859.
Office Action dated Mar. 31, 2010 in U.S. Appl. No. 11/776,411.
Bernard Sklar, "Digital Communications, Fundamentals and Applications," 2$^{nd}$ Edition, Prentice Hall PTR, pp. 14-15.
Office Action dated Mar. 9, 2010 in U.S. Appl. No. 10/726,794.
Office Action dated Mar. 9, 2010 in U.S. Appl. No. 10/909,027.
Office Action dated Feb. 19, 2010 in U.S. Appl. No. 10/726,441.
Office Action dated Nov. 23, 2009 in U.S. Appl. No. 11/742,222.
Notice of Allowance dated Dec. 31, 2009 in U.S. Appl. No. 10/726,895.
Office Action dated Feb. 6, 2009 from Chinese Patent Application No. 200410038545.8.
Office Action dated Jan. 6, 2010 in U.S. Appl. No. 11/740,859.
Office Action dated Oct. 8, 2009 in U.S. Appl. No. 11/776,411.
Office Action dated Jan. 11, 2010 in U.S. Appl. No. 12/137,458.
Office Action dated Nov. 12, 2009 in U.S. Appl. No. 10/726,350.
Office Action dated Sep. 11, 2009 in U.S. Appl. No. 10/726,441.
Office Action dated Sep. 10, 2009 in U.S. Appl. No. 10/909,027.
Office Action dated Sep. 17, 2009 in U.S. Appl. No. 10/726,794.
Universal Serial Bus Specification, Revision 2.0, Apr. 27, 2000, p. 143.
Office Action dated Sep. 21, 2009 in U.S. Appl. No. 10/726,895.
Office Action dated Mar. 4, 2009 in U.S. Appl. No. 10/726,350.
Office Action dated Apr. 3, 2009 in CN Patent Application No. 200410044503.5.
Notice of Allowance dated Jun. 25, 2009 in U.S. Appl. No. 11/747,839.
Notice of Allowance dated Jul. 8, 2009 in U.S. Appl. No. 10/726,440.
Universal Serial Bus Specification, Revision 2.0, Apr. 27, 2000, pp. 7, 19, 32-34, 36, 38, 39, 43, 44, 48-51, 58, 66, 67, 72-74, 85, 86, 132, 206-209, 228, 229, 242-244, 269, 270, 278.
Fairhurst, MPEG-2 Transmission, Jan. 2001, pp. 1-9 from Internet at http://www.erg.abdn.ac.uk/research/future-net/digital-video/mpeg2-trans.html.
Office Action dated May 14, 2009 in U.S. Appl. No. 10/726,895.
Barr, "Copy Protection for High-Definition Baseband Video," Information Technology: Coding and Computing [online at http://ieeexplore.ieee.org/stamp/stamp.jsp?arnumber=844202&isnumber=18266, Aug. 6, 2002.

(56) References Cited

OTHER PUBLICATIONS

Office Action dated Oct. 21, 2008 from U.S. Appl. No. 11/747,839.
Office Action dated Oct. 31, 2008 in Chinese Patent Application No. 200410095171.3.
Chinese Office Action dated Nov. 28, 2008 in CN Application No. 200410071497.2.
Office Action dated Jan. 5, 2009 in U.S. Appl. No. 10/726,440.
Notice of Allowance dated Jan. 7, 2009 in U.S. Appl. No. 11/742,387.
Office Action dated Mar. 3, 2009 in U.S. Appl. No. 10/726,440.
Office Action dated Mar. 6, 2009 in CN Patent Application No. 200410043419.1.
Office Action dated Mar. 13, 2009 in CN Patent Application No. 200410095171.3.
Search Report dated Apr. 2, 2009 in EP Application No. 08153454.7.
Office Action dated Apr. 2, 2009 in U.S. Appl. No. 10/726,794.
Office Action dated Apr. 6, 2009 in U.S. Appl. No. 10/909,027.
Office Action dated May 26, 2009 in U.S. Appl. No. 11/742,222.
Examination Report dated Dec. 7, 2006 from European Patent Application No. 04252055.1.
Austrian Search and Exam Report dated Feb. 9, 2007 issued in corresponding Singapore Application No. 200401975-8.
Austrian Exam Report dated Apr. 30, 2007 issued in corresponding Singapore Application No. 200405336-9.
Australian Search Report dated May 15, 2007 issued in corresponding Singapore Application No. 200405099-3).
Austrian Search and Exam Report dated Feb. 16, 2007 issued in corresponding Singapore Application No. 200402060-8.
Search Report dated Oct. 7, 2005 from Singapore Patent Application No. 200405129-8.
Search Report dated Oct. 12, 2005 from Singapore Patent Application No. 200405115-7.
Search Report dated Dec. 2, 2005 from European Patent Application No. 04255610.0.
Search Report dated Dec. 8, 2005 from European Patent Application No. 04255609.2.
Search Report dated Jun. 30, 2006 from Singapore Patent Application No. 200405336-9.
Search and Exam Report dated Feb. 9, 2007 issued in corresponding Singapore Application No. 200401166-4.
Austrian Search and Exam Report dated Feb. 16, 2007 issued in corresponding Singapore Application No. 200401973-3.
Austrian Search and Exam Report dated Feb. 16, 2007 issued in corresponding Singapore Application No. 200401979-0.
Search Report dated Dec. 16, 2004 from European Patent Application No. 04255786.8.
Examination Report dated Feb. 28, 2006 from European Patent Application No. 04255609.2.
Austrian Search and Exam Report dated Feb. 16, 2007 issued in corresponding Singapore Application No. 200402061-6.
Search Report dated Mar. 15, 2006 from European Patent Application No. 04255610.0.
Office Action dated Apr. 4, 2008 in CN Patent Application No. 200410043419.1.
Office Action dated Sep. 12, 2008 in CN Patent Application No. 200410044503.5.
Examination Report dated Mar. 1, 2006 from Singapore Patent Application No. 200402057-4.
Office Action mailed Jul. 9, 2007 from related U.S. Appl. No. 10/726,895.
Office Action mailed Dec. 28, 2007 from U.S. Appl. No. 10/726,895.
Office Action dated Aug. 6, 2008 from U.S. Appl. No. 10/726,895.
Wickelgren, IJ, "The Facts About Firewire," IEEE Spectrum, IEEE Inc., New York, US, vol. 34, No. 4, Apr. 1997, pp. 19-25, XP002051393, ISSN: 0018-9235.
Kobayashi, "DisplayPort Technical Overview," http://web.archive.org/web/20060726222849/http://gnss.com/technology/DisplayPort+Technical+Overview+White+Paper.pdf, Jun. 26, 2006.
Silicon Image, "High-bandwidth Digital Content Protection," White Paper, Feb. 2000, retrieved from the Internet at http://www.siliconimage.com/docs/SiI-WP-002-A.pdf.
Sung et al., "DVI: A standard for the digital monitor interface," Silicon Image, Inc., Cupertino, CA, 1999, 4 pgs.
High-Definition Multimedia Interface Specification, Informational Version 1.0, Sep. 4, 2003, 52 pgs.
International Search Report in related Chinese Application No. 200410044503.5 dated Jun. 29, 2007.
"CLUT," http://en.wikipedia.org/wiki/CLUT.
"Packet," http://en.wikipedia.org/wiki/Packet.
Bloks, RHJ, "The IEEE-1934 high speed serial bus," Philips Journal of Research, Elsevier, Amsterdam, NL, vol. 50, No. 1, 1996, pp. 209-216, XP004008212 ISSN: 0165-5817.
Chang et al., "Digital Visual Interface," Technology Brief, Dell, May 2000.
Eidson et al., "30.2: HDMI: High-Definition Multimedia Interface," Silicon Image, Inc., Sunnyvale, CA, SID 03 Digest, 2003, pp. 1024-1027.
"Digital Visual Interface (DVI), Revision 1.0," Apr. 2, 1999, http://wwwddwg.org/lib/dvi_10.pdf, Figures 2-1, 3-1, 4-1; sections 1.32, 2.1, 2.2.5, 2.6, 3.1.4, 3.3, 4.1; pp. 8, 10, 14-15, 23-25, 30-31, 33-34.
Office Action mailed Aug. 5, 2005 from U.S. Appl. No. 10/726,934.
Office Action mailed Aug. 9, 2005 from U.S. Appl. No. 10/726,438.
Office Action mailed Aug. 9, 2005 from U.S. Appl. No. 10/727,131.
Office Action mailed Nov. 1, 2005 from U.S. Appl. No. 10/726,438.
Office Action mailed Nov. 1, 2005 from U.S. Appl. No. 10/727,131.
Office Action mailed Nov. 2, 2005 from U.S. Appl. No. 10/726,802.
International Search Report dated Jun. 14, 2006 from European Patent Application No. 04252055.1.
Examination Report dated Jul. 5, 2006 from European Patent Application No. 04255611.8.
Examination Report dated Nov. 13, 2006 from European Patent Application No. 04255609.2.
Office Action mailed Dec. 5, 2006 from U.S. Appl. No. 10/726,802.
VESA Display Port Standard, Version 1.1, Mar. 19, 2007.
Office Action mailed Jun. 26, 2007 from U.S. Appl. No. 10/762,680.
Office Action mailed Jun. 27, 2007 from U.S. Appl. No. 10/726,794.
EPO Exam Report in EP Application No. 04255786.8 dated Jul. 5, 2007.
Final Rejection mailed Sep. 21, 2007 from U.S. Appl. No. 10/909,103.
Notice of Allowance mailed Sep. 24, 2007 in U.S. Appl. No. 10/726,802.
Office Action dated Nov. 2, 2007 from Chinese Patent Application No. 2004100950502.4.
Supplemental Notice of Allowance mailed Nov. 6, 2007 in U.S. Appl. No. 10/726,802.
Office Action mailed Nov. 26, 2007 from U.S. Appl. No. 10/909,027.
Office Action mailed Nov. 27, 2007 from U.S. Appl. No. 10/726,794.
Office Action dated Jan. 8, 2008 in U.S. Appl. No. 10/762,680.
Office Action dated Jan. 23, 2008 from U.S. Appl. No. 11/747,839.
Notice of Allowance dated Jan. 29, 2008 in U.S. Appl. No. 10/726,802.
Notice of Allowance dated Mar. 5, 2008 in U.S. Appl. No. 10/909,103.
Austrian Search Report dated Mar. 7, 2008 from Singapore Application No. 200401969-1.
Austrian Examination Report dated Mar. 7, 2008 from Singapore Application No. 200401969-1.
European Search Report dated Mar. 13, 2008 in EP Application No. 04251582.5.
European Search Report dated Mar. 13, 2008 in EP Application No. 04252056.9.
European Search Report dated Mar. 18, 2008 from EP Application No. 04252202.9.
European Search Report dated Mar. 28, 2008 in EP Application No. 04252054.4.
Chinese Office Action dated Mar. 28, 2008 in Chinese application No. 200410044503.5.
European Search Report dated Mar. 28, 2008 from EP Application No. 04252203.7.
European Search Report dated Mar. 28, 2008 from EP Application No. 04252057.7.

(56) References Cited

OTHER PUBLICATIONS

Office Action dated Mar. 31, 2008 from U.S. Appl. No. 10/726,794.
European Search Report dated Apr. 3, 2008 from EP Application No. 04252205.2.7.
Chinese Office Action dated Apr. 4, 2008 in Chinese Application No. 200410047784.X.
Office Action dated Apr. 9, 2008 from U.S. Appl. No. 10/909,027.
Notice of Allowance dated Apr. 25, 2008 from U.S. Appl. No. 10/726,802.
Office Action dated May 23, 2008 from Chinese Patent Application No. 200410071498.7.
Examination Report dated Jun. 5, 2008 from European Patent Application No. 04252057.7.
Examination Report dated Jun. 5, 2008 from European Patent Application No. 04251581.7.
Examination Report dated Jun. 5, 2008 from European Patent Application No. 04252202.9.
Examination Report dated Jun. 5, 2008 from European Patent Application No. 04252056.9.
Examination Report dated Jun. 5, 2008 from European Patent Application No. 04252054.4.
Examination Report dated Jun. 5, 2008 from European Patent Application No. 04252203.7.
Office Action dated Jun. 23, 2008 from U.S. Appl. No. 10/762,680.
Office Action dated Jun. 24, 2008 from U.S. Appl. No. 10/726,794.
Chinese Office Action dated Jun. 27, 2008 from Chinese Patent Application No. 200410038432.8.
Chinese Office Action dated Jun. 27, 2008 in Chinese Application No. 200410038546.2.
Office Action dated Jun. 27, 2008 from U.S. Appl. No. 10/909,085.
Search Report dated Jun. 30, 2008 in EP Application No. 08155262.2.
Search Report dated Jul. 2, 2008 in EP Application No. 08155263.0.
Office Action dated Jul. 2, 2008 from European Patent Application No. 04252205.2.
Office Action dated Jul. 4, 2008 from Chinese Patent Application No. 200410038545.8.
Search Report dated Jul. 10, 2008 from European Patent Application No. 08153726.8.
Search Report dated Jul. 21, 2008 from European Patent Application No. 08153724.3.
Office Action dated Aug. 1, 2008 in U.S. Appl. No. 10/909,027.
Office Action dated Aug. 8, 2008 from Chinese Patent Application No. 200410045686.2.
Office Action dated Aug. 8, 2008 from Chinese Patent Application No. 200410087460.9.
Office Action dated Aug. 19, 2008 from U.S. Appl. No. 10/726,440.
Office Action dated Aug. 29, 2008 from U.S. Appl. No. 11/742,387.
Notice of Allowance dated Oct. 1, 2008 in U.S. Appl. No. 10/909,085.
Office Action dated Oct. 16, 2008 in U.S. Appl. No. 10/909,027.
Notice of Allowance dated Oct. 21, 2008 in U.S. Appl. No. 10/762,680.
Kasai N. et al., "Digital Packet Video Link 1-9 for Super High Resolution Display," IEICE Transactions on Electronics, Electronics Society, Tokyo, JP, vol. E84-C, No. 11, Nov. 2001, pp. 1630-1636, XP001110772, ISSN: 0916-8524, paragraphs 0001, 0002.
High-bandwidth Digital Content Protection System, Revision 1.0, Intel Corporation, Feb. 17, 2000.
Jun Hanari and Manabu Watanabe et al., "15.2: Development of an UXGA Display System by a Digital Packet Video Link," SID 01 Digest, vol. XXXII, Jun. 5, 2001, pp. 210-213, XP007007646, paragraphs 0001-0003.
Notice of Allowance dated Sep. 9, 2011 from U.S. Appl. No. 11/747,844.
Office Action dated Sep. 2, 2011 in U.S. Appl. No. 12/610,928.
Notice of Allowance dated Aug. 19, 2011 in U.S. Appl. No. 11/776,411.
Office Action dated Mar. 2, 2011 in U.S. Appl. No. 11/747,844.
Office Action dated Jun. 6, 2011, in U.S. Appl. No. 11/740,859.
Office Action dated Apr. 1, 2011 in U.S. Appl. No. 11/776,411.

* cited by examiner

WIRELESS MULTIMEDIA TRANSPORT METHOD AND APPARATUS

CROSS REFERENCE TO RELATED APPLICATIONS

This patent application is a divisional of and claims priority under 35 U.S.C. 120 to co-pending U.S. patent application Ser. No. 12/767,429 filed on Apr. 26, 2010, entitled "WIRELESS MULTIMEDIA TRANSPORT METHOD AND APPARATUS" naming Osamu Kobayashi as inventor, which is a non-provisional of and claims priority to U.S. Provisional Patent Application No. 61/177,977 filed on May 13, 2009, entitled WIRELESS MULTIMEDIA TRANSPORT METHOD by Osamu Kobayashi, which are hereby incorporated by reference herein in their entirety.

This application is also related to the following U.S. Patents, each of which are incorporated by reference, (i) U.S. Pat. No. 7,424,558, filed Dec. 2, 2003 and issued Sep. 9, 2008, entitled "METHOD OF ADAPTIVELY CONNECTING A VIDEO SOURCE AND A VIDEO DISPLAY" naming Osamu Kobayashi as inventor; (ii) U.S. Pat. No. 7,068,686, filed Dec. 2, 2003 and issued Jun. 27, 2006, entitled "METHOD AND APPARATUS FOR EFFICIENT TRANSMISSION OF MULTIMEDIA DATA PACKETS" naming Osamu Kobayashi as inventor; (iii) U.S. Pat. No. 7,620,062, filed on Dec. 2, 2003 and issued Nov. 17, 2009, entitled "METHOD OF OPTIMIZING MULTIMEDIA PACKET TRANSMISSION RATE" naming Osamu Kobayashi as inventor; (iv) U.S. Pat. No. 7,088,741, filed Dec. 2, 2003 and issued Aug. 8, 2006, entitled "USING AN AUXILARY CHANNEL FOR VIDEO MONITOR TRAINING" naming Osamu Kobayashi as inventor; (v) U.S. Pat. No. 7,733,915, filed Dec. 2, 2003 and issued Jun. 6, 2010, entitled "MINIMIZING BUFFER REQUIREMENTS IN A DIGITAL VIDEO SYSTEM" naming Osamu Kobayashi as inventor; (vi) U.S. Pat. No. 6,992,987, filed Dec. 2, 2003 and issued Jan. 31, 2006, entitled "ENUMERATION METHOD FOR THE LINK CLOCK RATE AND THE PIXEL/AUDIO CLOCK RATE" naming Osamu Kobayashi as inventor; and (vii) U.S. Pat. No. 7,487,273, filed on Jul. 29, 2004 and issued Feb. 3, 2009, entitled "DATA PACKET BASED STREAM TRANSPORT SCHEDULER WHEREIN TRANSPORT DATA LINK DOES NOT INCLUDE A CLOCK LINE" naming Osamu Kobayashi as inventor.

FIELD OF THE INVENTION

The invention relates to wireless data transmission in multimedia networks. More specifically, the invention describes wireless video data transmission in a multimedia device network and method of stream packet delivery with a data packet stream scheduler and methods of use thereof.

BACKGROUND OF THE INVENTION

Modernly, devices transmitting multi-media (audio, video, images, viewable data, etc.) have come into common and widespread usage. Additionally, wireless data transmission methods and devices have come into widespread usage for transmitting a wide array of data types. More recently, such wireless technologies have come into use with video and other multi-media data.

In the current art, some applications of multi-media data to the wireless space have been employed with mixed success. One particularly attractive area of wireless data transmission concerns that of video data within networks. In particular, it is attractive to be able to wirelessly transmit video and other multi-media data between many different devices comprising a multi-media device network.

One of the problems facing such wireless communication of multi-media data is that posed by conditions of changing bandwidth between wireless devices. In particular, existing modes of wireless video communication do not have effective modes for adapting to conditions of changing wireless bandwidth. Such reduced bandwidth can arise due to conditions of interference and other conditions. One common occurrence can be a person walking between a wireless source device and its associated sink device. A lowered bit rate or reduced bandwidth is commonly observed under these or other conditions. In some wireless systems, quality of service policies can be used to implement measures that can adapt to changes in network transmission quality and service availability.

However, such approaches are not readily adaptable to use for multi-media devices such as video devices. These devices, as they currently exist, do not enable quality of service adjustments to be made in data transmission. This problem is particularly acute when encountered in video devices, and particularly high definition video devices that require a great deal of bandwidth to accommodate the large amounts of data used to render high definition images. Because quality of service information is not generally transmitted between multimedia devices, it cannot be used to adjust video (or other multimedia) qualities and properties to maintain a desired level of fidelity in the signal as rendered by associated sink devices.

What is needed are methods and devices suitable for monitoring quality of service information concerning multimedia data signals and in some cases adapting the network devices to accommodate changing network conditions.

Thus, it is desirable to create a data transport system suitable for transmitting multimedia data in a wireless environment.

SUMMARY OF THE INVENTION

A multimedia data transmission system of the invention includes a multimedia source module for providing source multimedia content comprising at least one multimedia data stream arranged in a packetized data stream. One source module can include a transmitter for transmitting the packetized data stream to a wireless transceiver. Also, a source quality of service receiver is included for receiving quality of service information from said source wireless transceiver. The system further includes a wireless transceiver for receiving said packetized data stream from the source module and transmitting it to a sink wireless device. The transceiver comprising wireless receiver circuitry capable of receiving downstream quality of service information from a sink wireless device in wireless communication with the wireless transceiver. Also, the wireless transceiver includes transmitter circuitry for transmitting quality of service information further upstream to the source module. Also, the system includes a data linking unit for coupling the multimedia source module with the source wireless transceiver. The linking unit having a unidirectional main link for transporting the packetized data stream from the source module to the wireless transceiver and at least one supplementary link (sideband channel) for transmitting the quality of service information from wireless transceiver upstream to the source module.

In another embodiment the system can comprise a multimedia interface system. Such an interface can include a multimedia transceiver module configured to receive source multimedia content arranged in a packetized data stream. This module can include receiver circuitry for receiving said packetized data stream from a multimedia content source, transmitter circuitry for transmitting said packetized data stream to a wireless transceiver, quality of service receiver circuitry for receiving quality of service information from the wireless transceiver and quality of service transmitter circuitry for transmitting the received quality of service information to the multimedia content source. Moreover, the interface can include a particularly configured wireless transceiver having receiver circuitry for receiving the packetized data stream from the transceiver module. Also, conversion circuitry suitable for converting the packetized data stream into a wireless signal and transmitter circuitry for transmitting the wireless signal to a wireless sink. Also, the interface can include wireless quality of service receiver circuitry for receiving quality of service information from the wireless sink. Also, included can be quality of service transmitter circuitry for transmitting the received quality of service information to the multimedia transceiver module. The interface also includes a data linking unit that couples the multimedia transceiver module with the wireless transceiver. One linking unit embodiment includes a unidirectional main link for transporting the packetized data stream from the multimedia transceiver module to the wireless transceiver and including at least one supplemental link (sideband channel) for transmitting quality of service information from the wireless transceiver to the multimedia transceiver module.

The invention can further be embodied in a method for enabling such wireless transmission of multimedia content. The method including receiving source multimedia content encoded as a packetized data stream transmitted by a multimedia source device. The packetized data stream received at a wireless transmission device. Further the wireless device wirelessly transmitting said packetized data stream to a wireless sink as a wireless signal. Again, quality of service information is received at the wireless transmitter device from the wireless sink, wherein the quality of service information is associated with said wireless signal. Additionally, the quality of service information is transmitted upstream to said multimedia source device. The source device can adjust at least one of said source multimedia content or said packetized data stream in response to the quality of service information.

The invention can further be embodied as a computer program product. The product being encoded onto a tangible computer readable media or specifically stored and/or operated upon by specific devices. The product including computer readable instructions for enabling the following: Receiving source multimedia content encoded as a packetized data stream transmitted by a multimedia source device. The packetized data stream received at a wireless transmission device. Wirelessly transmitting said packetized data stream to a wireless sink as a wireless signal. Receiving quality of service information at the wireless transmitter device from the wireless sink, wherein the quality of service information is associated with said wireless signal. Transmitting the quality of service information upstream to said multimedia source device. Adjusting the source device such that adjustments can be made to at least one of said source multimedia content or said packetized data stream in response to the quality of service information.

In another embodiment, a data structure for use in a wireless multimedia network is disclosed. The network having a multimedia source device wirelessly coupled with multimedia sink device and wirelessly transmitting a packetized data stream configured in a wireless transport format. That data structure being a data transfer unit having a predetermined length, a schedule cycle marker symbol that delineates successive transfer units in the stream, a plurality of defined payload spaces, and a filler portion. The payload spaces including one for each originating source data stream to be transmitted using the transfer unit such that the size of the payload space is associated with the native stream rate for each source data stream. The filler portion arranged so that it occupies a portion of the transfer unit not occupied by the schedule cycle marker symbol and not occupied by the payload spaces.

DETAILED DESCRIPTION OF SELECTED EMBODIMENTS

Reference will now be made to particular embodiments of the invention, several examples of which are illustrated in the accompanying drawings. While the invention will be described in conjunction with particular embodiments, it will be understood that the invention is not intended to be limited to the described embodiments. On the contrary, it is intended to cover alternatives, modifications, and equivalents as may be included within the spirit and scope of the invention as defined by the appended claims.

The invention will now be described in terms of a multimedia system. In particular, a video display system having a video source coupled to a video sink, or receiver, by way of a packet based digital interface. In particular, the video source is coupled with a wireless transmission system which is wirelessly coupled with a wireless receiver system which is coupled with a video sink. Importantly, apparatus and modes of operation that more fully support quality of service (QoS) functionality are disclosed. Also, quality of service implementation methods as used in multimedia device environments are also disclosed.

Figure 1:
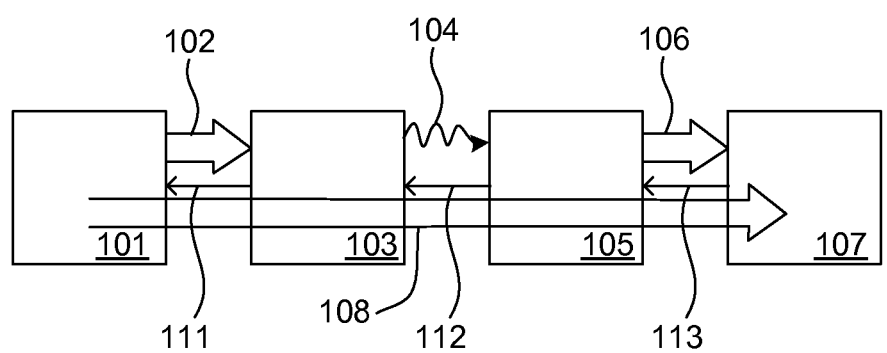
FIG. 1 shows a generalized representation of a multimedia network having a virtual channel with wireless data connections.

As indicated briefly in FIG. 1, a simplified multimedia system 100 is depicted. In the system, a multimedia source device 101 provides multimedia content as a packetized data stream 102 to a wireless transceiver 103 which transmits the content as a wireless signal 104 to a wireless receiver 105 on the sink end which converts the signal 104 into a displayable format 106 which is transmitted to a multi-media sink device 107. The entire path from a stream source 101 to a stream sink 107 defines a virtual communication channel 108 through which the multimedia data content is transmitted.

The system is enhanced by a series of data transmission paths (111, 112, 113) enabling the transmission of quality of service (QoS) information backward from the stream sink device 107 to the stream source device 101. Particularly useful are the paths generally described as 111 and 112. The transmission of the quality of service information enables adjustments to be made on the data transmission end of the stream to enable signal more optimized to the current quality of service to be produced.

It should be noted that the rate at which data is transmitted through the virtual channel 108 referred to as a channel bit rate. It is also understood that the wireless signal 104 is often subject to interference and degradation which can reduce its data rate and reduce its bandwidth.

Figure 2:
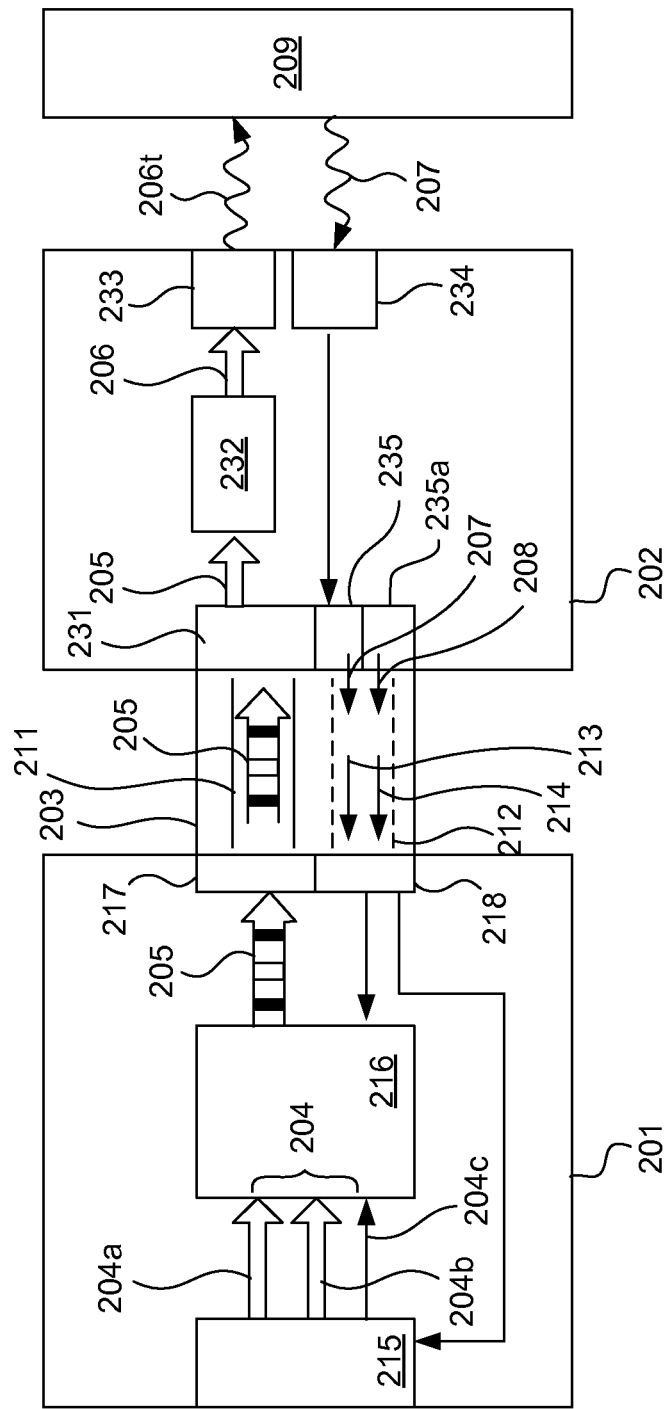
FIG. 2 is a diagrammatic illustration of a multimedia system that includes a source end wirelessly connected with a sink device in accordance with aspects of the invention.

A few useful attributes of the invention can be understood with respect to FIG. 2. FIG. 2 is a schematic box diagram illustrating one embodiment of the invention capturing several functional aspects of a source system. In particular, FIG. 2 illustrates a multimedia source module 201 and its operational relationship with an associated wireless transceiver module 202. The source module 201 and the associated wireless transceiver module 202 are coupled using a linking unit 203.

The linking unit has a uni-directional main link 211 and a supplemental connection 212 that can transport a wide range of supplemental data. In one approach the main link is configured to transport a packetized data stream associated with multi-media source content. Additionally, a supplemental connection 212 can comprise a number of ancillary connections. For example such connections can include ancillary channels 213, 214 through which a variety of data can be transported. In particular, this supplemental connection 212 can be configured to transmit quality of service data. For example, such quality of service data can be transported from the wireless transceiver module 202 upstream to the source module 201.

In one implementation, ancillary channels 213, 214 can be configured to transmit data in a wide range of configurations. Typical examples include full duplex bi-directional communication channels, half-duplex bi-directional communication channels, in fact many different duplex formats (TDD, FDD, and so on) as well as unidirectional channels. In one implementation a first ancillary channel can comprise an auxiliary line capable of bi-directional communication and a second ancillary channel that can, for example, be a uni-directional communication channel. Specifically, the inventor points out that many supplemental connection 212 formats can be employed in accordance with the principles of the present invention.

One example of a suitable link is a so-called DisplayPort® compatible link such as may be described in the VESA DisplayPort standard. The data linking unit can be configured in many other formats and is specifically not limited to the DisplayPort links indicated above. The link carries a packetized data stream and can enable the transmission of quality of service information upstream from the wireless connection toward a source. Additionally, in particular embodiments the link supports the transmission of quality of service alert signals. However, as to link construction, the components illustrated here are examples only used to illustrate a general operating principle and should not be construed as limiting. The elements shown here can be configured as separate components, some being separated from the source or integral to it. It is contemplated that they can be combined in a number of configurations. Such embodiments can include system-on-a-chip embodiments, separate IC systems, software embedded in chip elements, embedded firmware, and so on.

As indicated briefly above, in one embodiment, the first ancillary channel can comprise a quality of service channel 213 suitable for transmitting quality of service information from the wireless transceiver 202 to the source module 201 and an another channel 214 for transmitting a quality of service alert signal from the wireless transceiver 201 to the source module 202.

In one particular implementation, the quality of service channel 213 can comprise a bi-directional auxiliary line of the linking unit 203. Additionally, the other line 214 can simply be a linking unit line used for sending hot plug connection signals. Instead of a hot plug signal, the line 214 can simply send a message (e.g., an interrupt request (IRQ)) that the source 201 will treat as a quality of service "alert" signal. Responsive to the alert signal, the source module 201 is enabled to read the incoming quality of service information from the auxiliary line 213.

By way of further description and with further reference to FIG. 2, a mode of operation for the system 200 is now described. Multimedia content is received at or generated by the source module 201. In one example, the source module 201 can include a processor 215 that can generate multimedia content 204 and/or receive said content 204 from another point of origin. The inventor describes a few non-limiting examples of source type devices, DVD players, set top boxes, computers, music players as well as many others.

The source 201 can further include a scheduler 216 which operates on the multimedia content 204 to generate a packetized data stream 205 associated with the multimedia content. This process will be described in some detail in latter portions of this specification. In brief, the scheduler configures the multimedia content as plurality of payloads that are introduced into the packetized data stream 205. Also, the each payload of the packetized data stream 205 is associated specific source data stream (e.g., 204a, 204b, 204c) of the multimedia content 204. In one particularly, useful embodiment, the packetized data stream 205 need not include a timing signal as the timing information can be encoded as structural feature of the packet stream as will be described elsewhere in this disclosure.

The packetized data stream 205 is then forwarded to transmission circuitry 217 of the source module 201 where is then transmitted downstream using a main link 211 of the main linking unit 203. Such a main link 211 is typically a physical link that can be a wired or optical transmission media as well as others.

Additionally, the source 201 further includes receive circuitry 218 arranged to receive quality of service information from downstream devices. This is a very important distinction between prior devices and this inventive implementation. Prior art devices do not receive downstream quality of service through a physical link such as provided by linking unit 203. The receive circuitry 218 is configured to receive downstream quality of service information and adjust the source 201 based on changing downstream data transmission environments. In particular, this approach is very helpful when one of the downstream components is engaged in wireless communication with another wireless component. Received quality of service information can be used to adjust the content 204 or adjust aspects of the packetized data stream 205. For example, in response to quality of service information (received from downstream) indicating a deteriorating or lower quality wireless communication channel, adjustments can be made at various points in the source system.

In one example, where the quality of service signal indicates a reduced bandwidth in a downstream wireless communication channel, the multimedia content can be altered to accommodate this change. For example, the resolution of the signal can be reduced to accommodate reduced bandwidth in the wireless channel. Or, data compression can be changed to accommodate the lower bandwidth.

In one illustration of producing lower resolution multimedia content, the processor can adjust a refresh rate of the content 204 output from the processor 215. For example, if the original content has a refresh rate of 120 Hz, the adjusted multimedia content 204 can be supplied to the scheduler with a lower refresh rate, for example, a standard 60 Hz signal. Thus, video signal will continue to arrive at the sink, but just at a different format, presumably indistinguishable by the ordinary watcher. By using such a reduced refresh rate a lesser amount of bandwidth is needed to transmit the signal. By the same token, as quality of service information indicating a better wireless connection and/or increased bandwidth is received at receiver 218, a higher refresh rate can be again used, up to the full extent provided by the original content. Additionally, the resolution can be changed by altering the content into other formats to accommodate decreases in bandwidth. For example, in one case multimedia content received in native 1920×1080 format can be converted to a lower resolution format such as 640×480 or a number of other formats, including non-standard formats. In fact, such signal resolution can be reduced to below DVI/HDMI specified lower limit of 22.5 Mps (mega pixels per second). Thus, this approach can circumvent some of the limitations of TMDS transport systems. Thus, content 204 could be provided, for example, in a range of 5 Mps to 22 Mps or even lower if bandwidth conditions render such an approach advantageous. The processor 215 can merely adjust the data format of content 204 to any level supported by the original multimedia content.

Additionally, as indicated above, the processor 215 can adjust the level of data compression used to encode the multimedia content 204. The processor can simply encode the content 204 into a more compressed format. For example, content initially encoded in a MPEG-2 format can be encoded into the more compressed MPEG-4 format to obtain higher data compression. This reduces the bandwidth needed by the content 204. All that is required is that the sink device support the encoding and/or resolution formats. In particular, all of this formatting and resolution information can be provided to the source 201 using the auxiliary line 213 of the data linking unit 203. Thus, the source 201 can be made aware of downstream component capabilities.

In an added or alternative approach, selected streams (e.g., 204a, 204b, 204c) can be deleted from the content 204. This can be accomplished at the processor level whereby the processor 215 can simply delete a stream (e.g., 204b) from the content 204 to accommodate a reduced bandwidth. Alternatively, or additionally, streams can be deleted at the scheduler 205 which simply deletes stream payload (associated with the deleted stream) from the multi-stream data transport packets that make up the packetized data stream 205. Details of such a process are explained in later portions of this disclosure. Information warning the downstream devices of this change can be provided via the auxiliary line 213 or even more advantageously via the packetized data stream 205 itself.

It should be noted that the source module 201 can be comprised as a group of integrated circuit chips. Additionally, any or all of the various components (215, 216, 217, 218) can form part of a system on a chip configuration. Additionally, such components can operate a series of computer readable instructions configured to enable the components to function as indicated in this disclosure. Additionally, the inventor points out that such computer readable instructions and associated data structures and programs can be embodied as firmware resident on the devices described herein.

The discussion continues with continued reference to FIG. 2. In further description of the system 200 and its modes of operation, references are now made to properties of an embodiment of the associated wireless transceiver module 202 in accordance with the principles of the present invention.

By way of further description and with further reference to FIG. 2, a mode of operation for the system 200 is now described. The transceiver module 202 includes receiver circuitry 231 configured to receive packetized data streams 205 from the source module 201. This data 205 is received through the main link 211 of the data linking unit 203. Once received at the circuitry 231, the packetized data stream 205 is forwarded to a wireless encoder 232 that configures the packetized data stream 205 as a wireless data stream 206 suitable for wireless transmission. The encoder can format the packetized data stream 205 into any supported wireless transport protocol. Such protocols can include but are not limited to Bluetooth, WiFi, and other wireless compatible data transmission formats. This wireless data stream 206 is wirelessly transmitted 206t (using wireless transmission circuitry 233) to a wireless sink device 209 that consumes or otherwise acts upon the wireless data. In some implementations the wireless encoder 232 and wireless transmission circuitry 233 form a single integrated component.

Additionally, the wireless sink 209 monitors the data transmissions received. The sink 209 can incorporate any of a number of quality of service protocols, measures, or systems to track signal quality at the sink 209. Based on the quality of the signal (e.g., 206t) received, the sink 209 can generate quality of service information that characterizes the behavior and quality of the wireless communication channel between wireless transceiver module 202 and the wireless sink 209. The nature and methodologies describing quality of service information are well known to those of ordinary skill in the art and accordingly not recited here in detail.

In this embodiment, the quality of service information 207 so generated can be transmitted back to the transceiver module 202. In this embodiment, the quality of service information 207 is wirelessly received by wireless receiver circuitry 234 of the transceiver module 202.

In one important attribute of this embodiment, this quality of service information is transmitted back upstream (toward source 201) where it can be used by the source 201 to alter data transmission. For example, the quality of service information 207 is then transmitted upstream to the source module 201 using quality of service transmitter circuitry 235 via the data linking unit 203. In one example, the quality of service information 207 can be transported back to the source 201 using the supplementary link 212 (e.g., using auxiliary channel 213) of the unit 203. In some embodiments, the quality of service transmitter circuitry 235 can include circuitry 235a suitable for generating quality of service alert signals 208. Such signals 208, as discussed above, can simply be IRQ signals (such as are used in hot plug events) that place the source upstream component (here 201) on notice to expect quality of service information 207. These alert signals can be transmitted using one of the supplementary lines of the data link (e.g., 214). Accordingly, the quality of service information can be received and acted upon by the source module 201.

Additionally, the inventor points out that in the event of lost data, dropped payloads, or other insufficient data being sent, the sink can merely redisplay the same frame until new valid data is received.

It should be noted that the transceiver module 202 can be comprised as a group of integrated circuit chips. Additionally, any or all of the various components (231, 232, 233, 234, 235, 235a, and so on) can form part of a system on a chip configuration. Additionally, such components can operate a series of computer readable instructions configured to enable the components to function as indicated in this disclosure. Additionally, the inventor points out that such computer readable instructions and associated data structures and programs can be embodied as firmware resident on the devices described herein.

Figure 3:
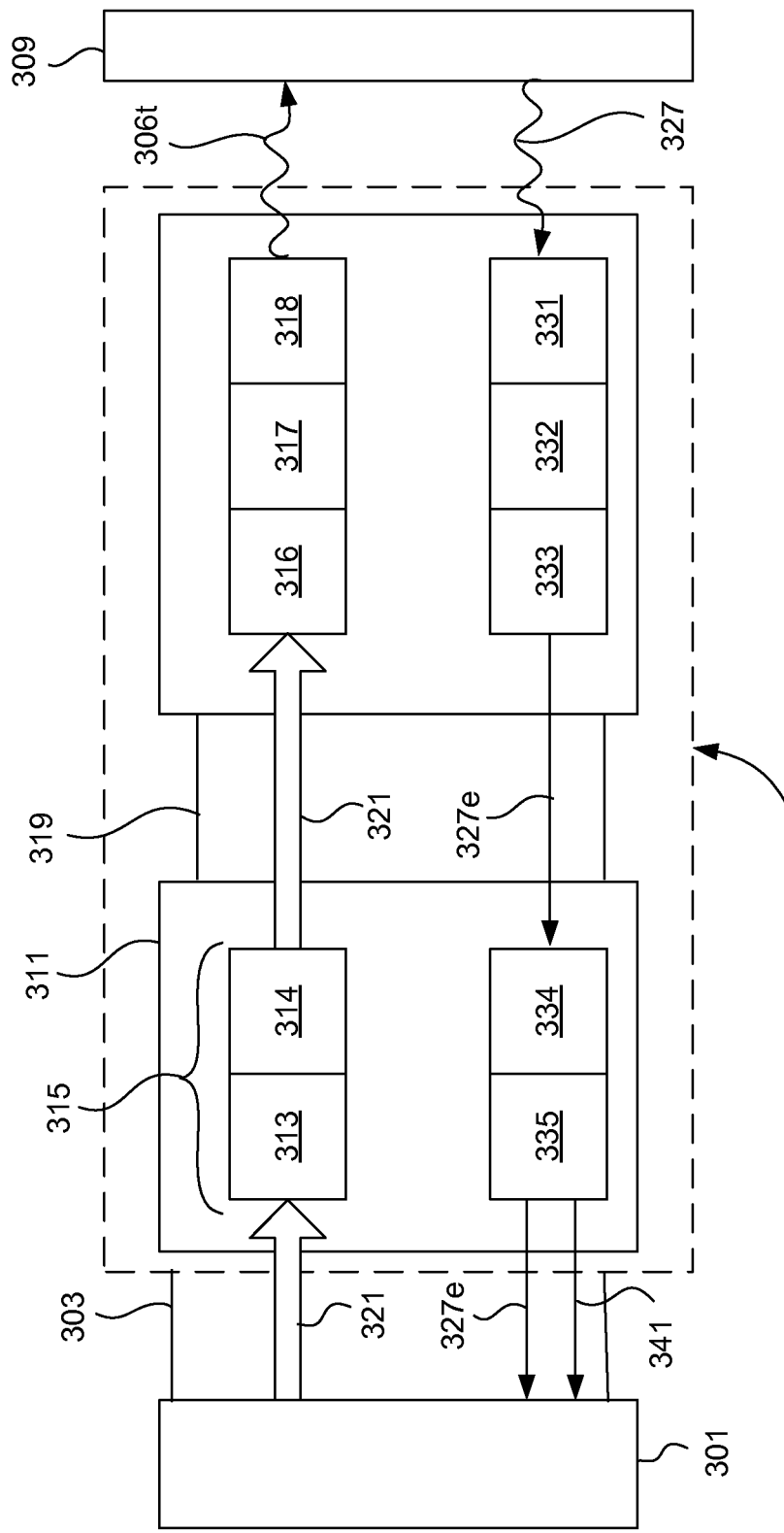
FIG. 3 is a diagrammatic illustration of a multimedia wireless interface system enabling wireless interconnection of a source device in accordance with aspects of the invention.

FIG. 3 is helpful for understanding another approach to the invention. In one common implementation, the user of an ordinary (non-wireless) multimedia device can desire to take advantage of wireless communication between multimedia devices. In such an implementation, ordinary multimedia components can be integrated into a wireless system by using a multimedia wireless interface system 300. The interface can be plugged into the multimedia device using a wired connection and enable a wireless output that can be received by a wireless device or receive wireless input from a wireless device.

In the depicted embodiment, the wireless interface 300 is coupled with another multimedia device 301. In this depicted embodiment, the device 301 can be a multimedia source device capable of outputting multimedia content. In this depiction, the source 301 is coupled to the interface 300 using a data linking unit 303 configured as for example, the data linking unit 203 described previously.

A wired interface 311 is coupled with the non-wireless device (here source device 301). And additionally, a wireless interface 312 is configured to wirelessly couple with another multimedia device 309. In this embodiment, the device 309 is characterized as a wireless sink device. Such a device can be a splitter, a router, multiplexer, a display, and/or a wide variety of wireless systems capable of receiving a wireless signal.

In this particular embodiment a data channel defines a communication channel between the source 301, data linking unit 303, interface 300, and the wireless communication line with the sink 309. With continued reference to FIG. 3, a mode of operation for the interface 300 is now described. To begin, the source 301 generates a packetized data stream 321 which is output from the source 301. It is transported to the interface 301 via a main link of the data linking unit 303. The interface 300 includes a "wired interface" 311 which is really just a non-wireless interface that can be an optical interface of a wired connection but is not a wireless interface. It is pointed out that the wired interface 311 is linked to the wireless interface 312 using a data linking unit 319 of a type well described previously.

The "wired interface" 311 includes receiver circuitry 313 configured to receive the packetized data streams 321 from the source 301. The receiver circuitry 313 can be configured an independent device or as is the case in many embodiments, be configured as a portion of a transceiver 315. As indicated, this packetized data 321 can be received by the receiver circuitry 313 through the main link of the data linking unit 303. The packetized data stream 321 is then forwarded (by the transmitter 314 of the transceiver 315) to a wireless interface 312. Typically, this data stream 321 is transmitted from the wired interface 311 to the wireless interface 312 using the main link of another data linking unit 319 within device 300. More particularly, this data 321 is received by a receiver 316 of the wireless interface 312. This packetized data stream 321 is then passed on to a wireless encoder 317 that configures the packetized data stream 321 as a wireless data stream suitable for wireless transmission. As indicated previously, such an encoder 317 can format the packetized data stream 321 into any supported wireless transport protocol, including but are not limited to Bluetooth, WiFi, and other wireless compatible data transmission formats. This wireless data stream is forwarded to transmission circuitry 318 that wirelessly transmits the stream 306$t$ to a wireless sink device 309 that consumes or otherwise acts upon the wireless data. In some implementations, the receiver 316, the wireless encoder 317, and wireless transmission circuitry 318 can form a single integrated component.

As indicated above, the wireless sink device 309 monitors the data transmissions received. The sink 309 can incorporate any of a number of quality of service protocols, measures, or systems to track signal quality at the sink 309. Based on the quality of the signal (e.g., 306$t$) received, the sink 309 can generate quality of service information that characterizes the behavior and quality of the wireless communication channel between wireless interface 300 and the wireless sink 309. The nature and methodologies describing quality of service information are well known to those of ordinary skill in the art and accordingly not recited here in detail.

In this embodiment, the quality of service information 327 so generated can be transmitted back to the interface 300. In this embodiment, the quality of service information 327 is wirelessly received by wireless quality of service receiver circuitry 331 of the interface 312.

The inventor points out that one important attribute of this embodiment is that this quality of service information 327 is transmitted back upstream (toward source 301) where it can be used by the source 301 to alter data transmission. For example, the wirelessly transmitted quality of service information 327 is received by wireless receiver 331 and then converted to a non-wireless format by an encoder which converts the signal to an electrically or optically transmittable format 327$e$ which is transmitted upstream using transmission circuitry 333.

This quality of service information 327$e$ is received at a receiver 334 of the non-wireless interface 311. In some embodiments, the non-wireless interface 311 generates a quality of service alert signal 341 that can be transmitted upstream to the source device 301 using a quality of service alert mode of the 335 transmitter. Additionally, the transmitter 335 transmits the quality of service information 327$e$ upstream to the source device 301. As described in detail, previously, the source 301 can then take action to adapt to the conditions identified in the quality of service information.

As described above, the quality of service information 327$e$ can be transmitted upstream through the linking unit 303. Additionally, the quality of service alert signal 341 is also transmitted upstream through the linking unit 303. In one example, the quality of service information 327$e$ and the alert signal 341 can be transmitted using the supplementary channels of the linking unit while reserving the main link for transmission of packetized data streams.

It should be noted that the interface 300 can be comprised as a group of integrated circuit chips. Additionally, any or all of the various components (313, 314, 316, 317, 318, 319, 331, 332, 333, 334, 335 as well as others) can form part of a system on a chip configuration. Additionally, such components can operate a series of computer readable instructions configured to enable the components to function as indicated in this disclosure. Additionally, the inventor points out that such computer readable instructions and associated data structures and programs can be embodied as firmware resident on the devices described herein.

Figure 4:
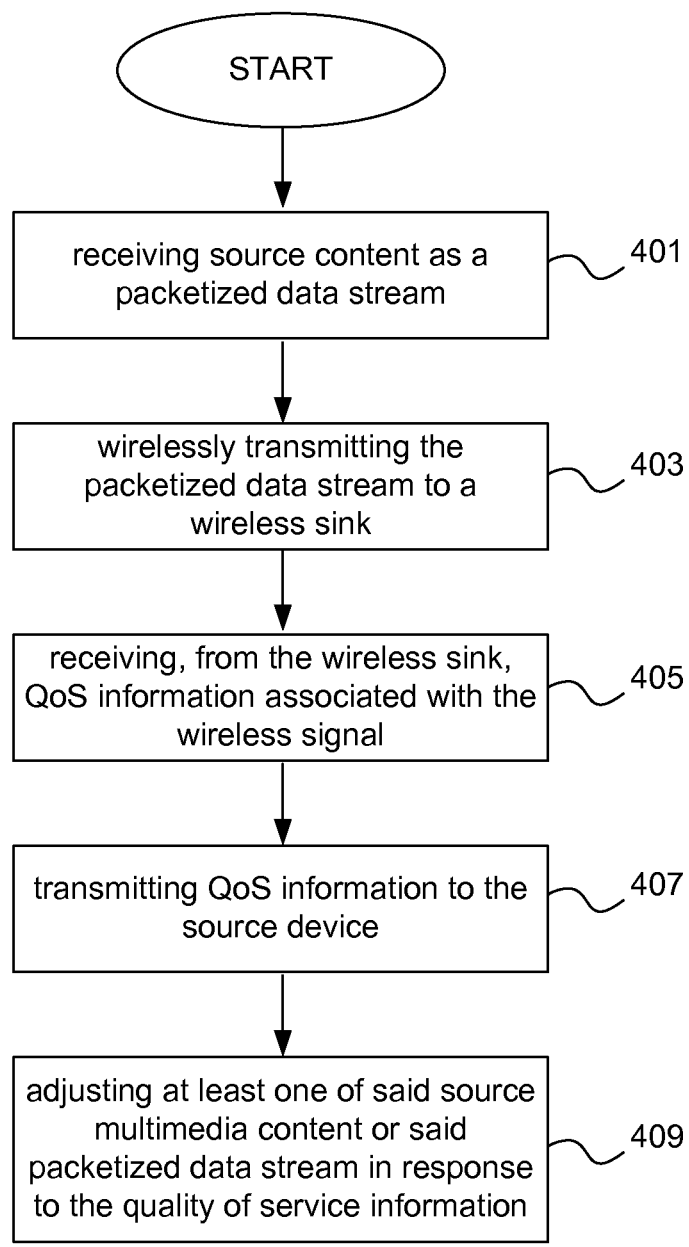
FIG. 4 is a flow diagram illustrating a method embodiment for enabling wireless transmission of multimedia data and the transmission of quality of service information in a multimedia system in accordance with the principles of the invention.

FIG. 4 is a flow diagram illustrating aspects of selected method embodiments of the invention. In one system including a source and a wireless sink such as illustrated, in one example, in FIG. 2 the following method embodiment can work well to implement principles of the invention.

Source multimedia content encoded as a packetized data stream is provided at a source device. (Step 401). For example, packetized data stream 205 of FIG. 2 at source 201.

This data is wirelessly transmitting to a wireless sink (Step 403). In one approach, this means that a packetized data stream 205 is converted into a wireless format 206 which is then transmitted using a wireless transmitter (e.g., 233) as a wireless signal (e.g., 206t). After monitoring the signal 206t quality of service information can be obtained by, for example, the wireless sink device 209. Alternatively, in some embodiments this information can be generated by the wireless transmitter device or system (e.g., 202, or 233). Then the wireless transmitter (e.g., 233, 202) receives quality of service information (Step 405). As indicated, this commonly provided by the wireless sink (for example, 209) but in some cases can be generated by the transmitter system (e.g., 202). The quality of service information is associated with said wireless signal. Once the wireless transmitter has the quality of service information it transmits such quality of service information upstream toward the source device (Step 407). This takes the form of non-wireless quality of service signal being propagated back upstream from the wireless receiver (e.g., 234). This is entirely new and not present in any of the cited art. Once, received at the source device, at least one of said source multimedia content or said packetized data stream is adjusted in response to the quality of service information (Step 409). Some such adjustment methods have been previously described. In this way, wireless multimedia data transmission can be improved, and can adjust to changing network bandwidth conditions.

The invention also describes methods for conducting data transport in a packetized data transmission stream. Such packetized systems can use a data linking unit. And when the same packetized data stream requires wireless transmission it is converted to a wireless format. This implementation has wide applicability to various multimedia systems. In one example, the system can be described in terms of a video display system having a video source coupled to a video sink, or receiver, by way of a packet based digital interface that includes a wireless communication transmission in the virtual stream. Data can be transmitted from the source, or transmitter, to the sink, or receiver using a stream of data multi-stream data transport micropackets (referred to herein as transfer units) transmitted through a single channel of the main link. For example, with reference to FIG. 2, a source device 201, receives any number of packetized video data streams from a set of sources. Each stream having associated stream attributes. In terms of the video system under discussion, such attributes can include video format, color depth, vertical synchronization information, horizontal synchronization information, etc. The many streams can be configured into payloads. Each payload containing a number of packets from the associated video stream. Advantageously, embodiments of the invention can combine the payloads of many different streams together into a common data structure that can be transmitted as a stream through a single virtual channel of linking device. This common data structure is the transfer unit described above. As indicated, a stream of transfer units can be transported to a receiver and associated sink device using a single channel of the main link.

In this transport methodology the data to header ratio is extremely high. This is accomplished by stripping the header information down to the absolute minimum and then transmitting all of the associated attribute data separate from the data. One example takes advantage of linking device having a data main link and an associated auxiliary link. In such a linking device, the auxiliary line can transfer the stream attribute data from the source to the receiver prior to the transmission of the data packets by way of the main link. In another embodiment, the data attribute information can be sent over the main link in a manner that does not decrease the data rate of the source data. One approach takes advantage of the fact that the transfer units are transmitted in a constant stream, whether in the active or blanking portions of a source AV blanking cycle. When the transfer units are transmitted during the blanking period of the blanking cycles they do not carry audio video (AV) data. Aspects of the invention can take advantage of these "blank" portions to send data attribute information. Thus, not using up data bandwidth over the main link. These approaches will all be discussed in greater detail in the paragraphs that follow.

In such approaches, packet headers with packet attribute information are not needed. The format of the stream of transfer units is defined and set and then forwarded to the receiver in an attribute packet before the AV data is sent. This attribute data enables the data to be extracted and correctly reconstructed into the appropriate streams at the receiver and forwarded to the appropriate destination. This attribute data is used to identify which data stream a payload is associated with (e.g., a stream ID or other such identifier) as well all the other needed attribute information required to characterize the data and decode each transfer unit. In this way packet overhead is almost completely eliminated preserving main link bandwidth for multimedia content, such as video and audio data providing an efficient packet transport mechanism.

In order to co-ordinate the transmission of the data in the main link, a transport stream scheduler provides for a flexible and efficient system, method, and apparatus for packaging and scheduling packets from a number of different source data streams into transfer units which can be transmitted over a single virtual channel of a data link. Additionally, a scheduler can be used to send stream attribute data from a source to a sink separate from the multimedia data from the source. Examples of such schedulers are employed in FIG. 2 as scheduler 216.

In embodiments of the invention, a data transport linking unit (including uni-directional main link and ancillary channels (e.g., a bi-directional auxiliary link and a hot plug IRQ line) can be employed. In this embodiment a virtual channel can transmit a stream of transfer units each capable of supporting several source data streams.

A transfer unit (multi-stream data transport packet) is a fixed size data transmission unit configured to transport several different payloads from several different source streams in a single transport unit. The size can be any size; however, the applicants have found that there are advantages in using transfer units that are 32 or 64 symbols long. This disclosure will discuss the invention in the context of a 64 symbol embodiment, but it is not limited to such. In use, the transfer units are generally uniform in size and include a Schedule Cycle Marker, a filler portion filled with dummy symbols and any from zero to a plurality of payloads.

In an ANSI 8b/10b encoding scheme, the Schedule Cycle Marker (SCM) symbol is a special control symbol that delineates each transfer unit from the next transfer unit in a stream of transfer units. Additionally, the transfer units can include zero, one, or more data payloads each comprising a set of data packets received from an associated source data stream. The size of these payloads is determined by the relation between data rate of the source data stream and the data rate for the particular data channel of the data link. In an example channel, it is common to transport data at a rate of about 10 Gb/s (gigabits per second). As indicated before, there is no real limit on the methodology, it is generally constrained by the capabilities and data rates of the various systems involved. In this example, the channel at issue has a channel bit rate of 2.56

Gb/s and the channel is configured to transport three source streams. Also, by way of example, three data streams are introduced at three different example data rates. These data streams are packetized as data payloads that are apportioned to each transfer unit in accord with their own native rates using the following relation. Each payload is allotted a number of symbols in accordance with a relation of the native stream rate to the channel bit rate. Accordingly, a particular payload (i) has a payload size PS, that is related to the transfer unit size (here 64 symbols) in accordance with ratio of stream bit rate to the channel bit rate (which characterizes the rate at which transfer units are transmitted through the channel in question).

In this way, a payload size is determined by the relative bit rate of the data stream compared to a channel bandwidth. For example, for a 64 symbol transfer unit, and the channel bit rate CBR of 2.56 Gb/s Table 1 shows representative packet sizes corresponding to selected stream bit rates. The inventors note that the number of symbols for each payload is typically rounded up.

TABLE 1

| Stream # | Channel Bit Rate (CBR) | Stream Bit Rate (SBR) | Payload Size (PS) |
|---|---|---|---|
| Stream 1 | 2.56 Gbps | 1.28 Gbps | 32 link symbols |
| Stream 2 | 2.56 Gbps | 0.64 Gbps | 16 link symbols |
| Stream 3 | 2.56 Gbps | 0.32 Gbps | 8 link symbols |

Thus, each transfer unit in the channel at issue includes 64 symbols arranged as follows. The first symbol is the SCM which is inserted to delineate each transfer unit. This is the only "header" required. It is followed by a first payload space with a size of 32 symbols which will be populated by a payload data packet comprising 32 symbols from stream 1. Then 16 symbols of a second payload space which will be populated by a data packet comprising 16 symbols from stream 2. Then 8 symbols of a third payload space which will be populated by a data packet comprising 8 symbols from stream 3. This comprises 57 symbols out of the 64 available in the transfer unit. The remaining seven symbols define a filler portion filled with dummy markers or non-data symbols. Each transfer unit in the channel stream is configured like this and remains so until a stream ends or is removed or, alternatively, streams are added. In such cases, the payload positions and filler portions are adjusted, new attribute data is sent to the receiver, and the new transfer units begin operation.

A multi-stream scheduler (e.g., 216) time division multiplexes (at the source) the multiple source streams into transfer units and de-multiplexes (at a sink end) the payloads of the multiple streams into a set of reconstructed data streams that correspond to the original streams at the transmitter. In the described embodiment, the transfer unit is sized in accordance with a set scheme. For example, as indicated, a fixed size (e.g., 64 symbols) transfer unit is commonly used to transport payload in the channel of the link. Prior to commencing the data stream transport, the transmitter notifies the receiver of stream attributes such as in the case of video data, color format and depth, geometry as well as the packet size associated with each data stream. Additionally, the message contains source attribute information concerning the packaging format of the transfer unit, stream ID, payload size, etc. With this information, the transmitter is able to decode the information transmitted in the transfer units. In the prior art, this information is transmitted as part of the header of each packet. In contrast, the present invention communicates this information separately. By separately communicating the attribute data, the overhead of the transmitted data is reduced to almost nothing. Essentially, the only overhead is the SCM, which in one implementation is one symbol in a 64 symbol transfer unit. This is a non-data overhead of less than 2% resulting in extraordinary data transmission efficiency.

In order to provide a further basis for the discussion of aspects of the invention, one example of a suitable digital video system is described well suited for implementation of the invention. It should be pointed out that many other such system implementations can be used. Some of which are well described.

Figure 5A:
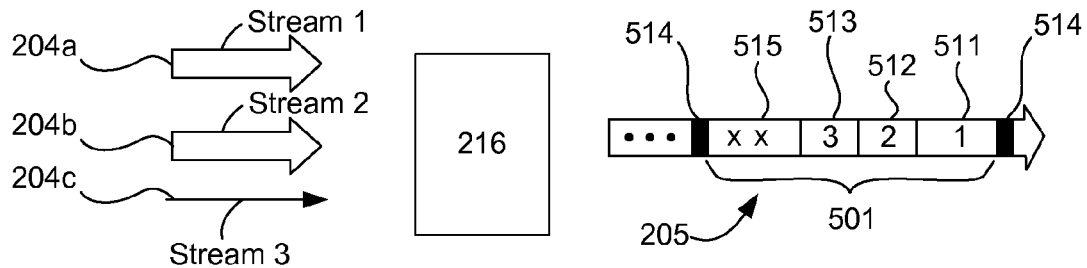
FIGS. 5($a$)-5($d$) are diagrammatic depictions of methods of packetizing data streams and dynamically deleting streams in response to changes in wireless band width.
Figure 5B:
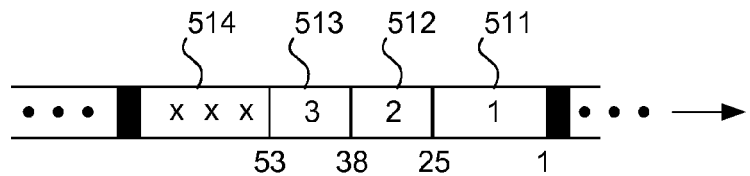
Figure 5C:
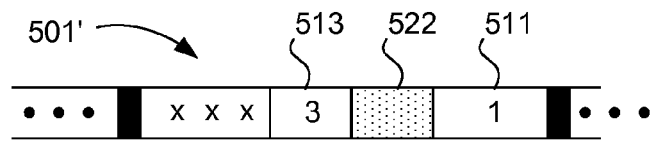
Figure 5D:
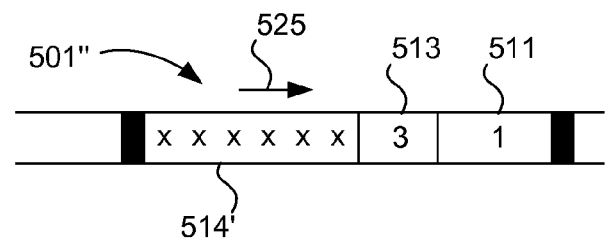

Typically, the transmitter receives one or more data streams from a multimedia source (e.g., 204a, 204b, 204c of FIG. 2). The scheduler 216 multiplexes data from the source data streams into data payloads associated with the source data streams. FIG. 5(a) illustrates this point slightly differently. Each payload is inserted into a transfer unit of the stream of transfer units. Accordingly, each transfer unit 501 includes a payload (511, 512, 513) for each stream multiplexed into the packetized data stream 205. Accordingly, the stream 205 comprises a string of transfer units, each populated with the plurality of payload (511-513) which are transmitted through the virtual channel to the eventual sink (e.g., 209). It is also pointed out that each transfer unit includes a schedule cycle marker (SCM) 514 and the unfilled portions of the transfer unit can be occupied by a filler portion 515 comprising a string of dummy symbols that completely fill the remaining portions of the transfer unit 501. It is also pointed out that there are circumstances under which the transfer units will have zero payloads comprising only the SCM and dummy symbols. It should be noted that the channel data rate (i.e., the data packet transfer rate) can be optimized. The data payloads 511-513 can take any number of forms such as video, graphic, audio, etc.

Typically, when the source is a video source, the data streams 511-512 can include various video signals that can have any number and type of well-known formats, such as composite video, serial digital, parallel digital, RGB, or consumer digital video. The video signal can be an analog video signal such as would be provided by an analog video source, for example, an analog television, still camera, analog VCR, DVD player, camcorder, laser disk player, TV tuner, set top box (with satellite DSS or cable signal) and the like. Also, the source can also include a digital image source such as for example a digital television (DTV), digital still camera, and the like. The digital video signal can be any number and type of well known digital formats such as, SMPTE 274M-1995 (1920×1080 resolution, progressive or interlaced scan), SMPTE 296M-1997 (1280×720 resolution, progressive scan), as well as standard 480 progressive scan video.

In the case where the source provides an analog image signal, an analog-to-digital converter (A/D) converts an analog voltage or current signal into a discrete series of digitally encoded numbers (signal) forming in the process an appropriate digital image data word suitable for digital processing. Any of a wide variety of A/D converters can be used. By way of example, other A/D converters include, for example those manufactured by: Philips, Texas Instrument, Analog Devices, Brooktree, and others.

In implementations where at least one of the source streams 511-513 comprise an analog type signal, an analog to digital converter (not shown) can be included to digitize the data into a digital data stream which is then packetized into appropriately sized payloads and then inserted into a transfer unit. Conversely, the sink will (e.g., 209) will then extract the payloads and reconstitute the originating data streams 204a, 204b, 204c into their original format. It should be noted that the link rate is independent of the originating data stream native stream rates. The only requirement is that the channel bandwidth be higher than the aggregate bandwidth of data stream(s) to be transmitted. In particular, that the channel bit rate be higher than the native stream bit rate.

In such cases where, the bandwidth suffers degradation which can occur in the wireless portion of the channel (or in some circumstances elsewhere) the filler 515 is simply dropped. Or in more severe cases some (or all of the streams can be dropped). At the sink end, the previous video frame is just displayed until new multimedia data is received.

This format can support laptop/all-in-one as well as HDTV and other consumer electronics applications. In addition to providing video and graphics data, display timing information can be embedded in the digital stream providing essentially perfect and instant display alignment, obviating the need for features like "Auto-Adjust" and the like. The transfer unit based nature of the inventive interface provides scalability to support multiple, digital data streams such as multiple video/graphics streams and audio streams for multimedia applications. In addition, a universal serial bus (USB) transport for peripheral attachment and display control can be provided without the need for additional cabling.

Regardless of the type of video source or video sink, however, the various data streams are digitized (if necessary) and packetized prior to transmission over the virtual channel. Typically, this is accomplished using scheduler circuitry and/or software that is coupled to or forms part of the transmitter. Once packetized into transfer units the data payloads are transmitted using, for example, a main link of a data linking unit link (e.g. 203). As mentioned Typically, such a link includes a uni-directional main link or isochronous data streams and a bi-directional auxiliary channel for quality of service information, link setup, and other data traffic (such as various link management information, attribute transmission, Universal serial bus (USB) data, etc.) and can include another line that can be used to transmit quality of service alert messages or hot plug interrupt messages and the like.

In the described embodiment, the speed, or transfer rate, of the main link 211 can be adjustable to compensate for link conditions. For example, in one implementation, the speed of the main link 211 can be adjusted in a range approximated by a slowest speed of about 1.0 Gbps to about 2.7 Gbps per channel. The various applications and data transmission attributes of such channels are describes in the previously referenced U.S. patent application Ser. No. 10/909,085 of Kobayashi.

Advantageously, the original data rates of the streams (204a, 204b, and 204c) can be recaptured (for example using a time-base recovery (TBR) unit) at a receiver. It can used time stamps embedded in the main link data packets, if necessary. It should be noted, however, that for appropriately configured multimedia devices, time base can be recovered without resort to a TBR unit. For example, the display data can be sent to the display driver electronics at the link character clock rate, thereby greatly reducing the number of channels required with a commensurate reduction in complexity and cost for the display. Many methods for synchronizing channel/link rates and pixel rates of the source data are known to those of ordinary skill, for example as shown in the previously referenced U.S. patent application Ser. No. 10/909,085 of Kobayashi. A few particularly advantageous approaches will be discussed else where in this patent.

An advantage of this approach is its ability to undergo dynamic stream deletion. In FIG. 5(*a*), an initial transfer unit 501 is shown with three payloads 511-513 (and their approximate demarcation symbols), a filler portion 515 filled with dummy symbols, and an SCM symbol 514. The same is depicted in FIG. 5(*b*), the first payload 511 associated with an example first source stream comprises 23 symbols (e.g., extending from symbols 1-24), the second payload 512 associated with the second source stream comprises 14 symbols (e.g., extending from symbols 25-38), the third payload 513 associated with the third source stream comprises 15 symbols (e.g., extending from symbols 39-53), and the filler 515 comprises the remaining 10 symbols (e.g., extending from symbol 54-64) which are a set of dummy symbols xxx.

A process for deleting a stream can begin by removing the payload for the stream to be deleted and then adjusting the transfer unit to accommodate the changes. Accordingly, when stream 2 is to be deleted, the payloads 512 associated with that stream are no longer inserted into the transfer units. For example, as shown in FIG. 5(*c*) a space 522 remains in the transfer unit 501'. Accordingly, the first payload 511 remains in the transfer unit (e.g., extending from symbols 1-24), the second payload 502 is removed leaving the gap 522 of 14 symbols (e.g., symbols 25-38), the third payload 513 also remains in its former position (15 symbols extending from symbols 39-53). The filler 514 also remains the same occupying symbols 54-64. At this point the deleted stream generally has designated symbols inserted to demarcate where the deleted stream was. For example, such markers can be inserted on either end of the stream 2 payload space (e.g. at symbol positions 25 and 38).

Once the stream is deleted and the remaining streams are concatenated to a contiguous line of payloads and the filler portion is increased in size to accommodate the reduction in payload spaces. This is depicted in FIG. 5(*d*) which shows the new configuration for the transfer unit 501". In this transfer unit a concatenation (represented by arrow 525) of the payloads is effected and the size of the filler 514' is now expanded. Accordingly, the first payload 511 remains in the transfer unit (e.g., extending from symbols 1-24), the third payload 513 is moved adjacent to the first payload (15 symbols now extending from symbols 25-39). The filler is expanded to occupy symbols 40-64. Thus, the new stream of transfer units is configured.

The system becomes aware of such impending deletion by, for example, a message sent by the sources (e.g., using the auxiliary line or in a blanking portion of a main link data stream). In one particular example, this deletion is initiated when the source is disconnected or the signal is lost and data is no longer being sent. At this point, the transmitter begins to pack the payload space formerly assigned to the source stream (and now being terminated) with dummy symbols (also referred to herein as stuffing symbols) such as indicated in stream 2 deletion of FIGS. 5(*b*)-5(*d*). Thus, once the transmitter is aware of the imminent termination of stream 2 (or when it stops receiving multimedia data from stream 2) it begins populating the payload space 522 with dummy symbols. Then indicator symbols are placed in the space 522 to mark the size and location of the payload spaces for the stream to be deleted. Subsequently, the transfer unit is adjusted to accommodate the deleted stream. Accordingly, in one embodiment three actions occur. The symbols that populate space 522 are terminated, the remaining streams in the transfer unit are concatenated, and the dummy portion is expanded to contain more dummy symbols to fill out the transfer unit. Once the sequence is completed and the stream is deleted, the process can be repeated for each additional stream to be deleted, until, in the extreme case, all streams are deleted. The new transfer units are transmitted without the deleted stream. As can readily be seen such a process is well suited to adapting to conditions of changing bandwidth.

It should also be noted that the relative size of each payload in a transfer unit provides an embedded time stamp in that by counting the number of data symbols for each payload with respect to the total length of the transfer unit (e.g., 64 symbols) provides a stream clock for the data stream associated with the respective payload. Thus, even for a series of payloads from a plurality of source data streams all populating the same transfer unit, the native rate of the source streams can be recovered. In one example case a stream clock $F_{stream\_clk}$ for a particular data stream can be simply recovered by determining the number of data symbols (M) of a payload as compared to the total number of symbols for the transfer unit (T) and associated with the link rate of the channel $F_{channel\_clk}$. More particularly, the stream clock $F_{stream\_clk}$ is determined by the following:

$$F_{stream\_clk} = (M/T) * F_{channel\_clk}$$

where M and P can be measured by the receiver 204. Table 2 below is a brief summary of the control symbols used in accordance with the principles of the invention as disclosed above.

Figure 6:
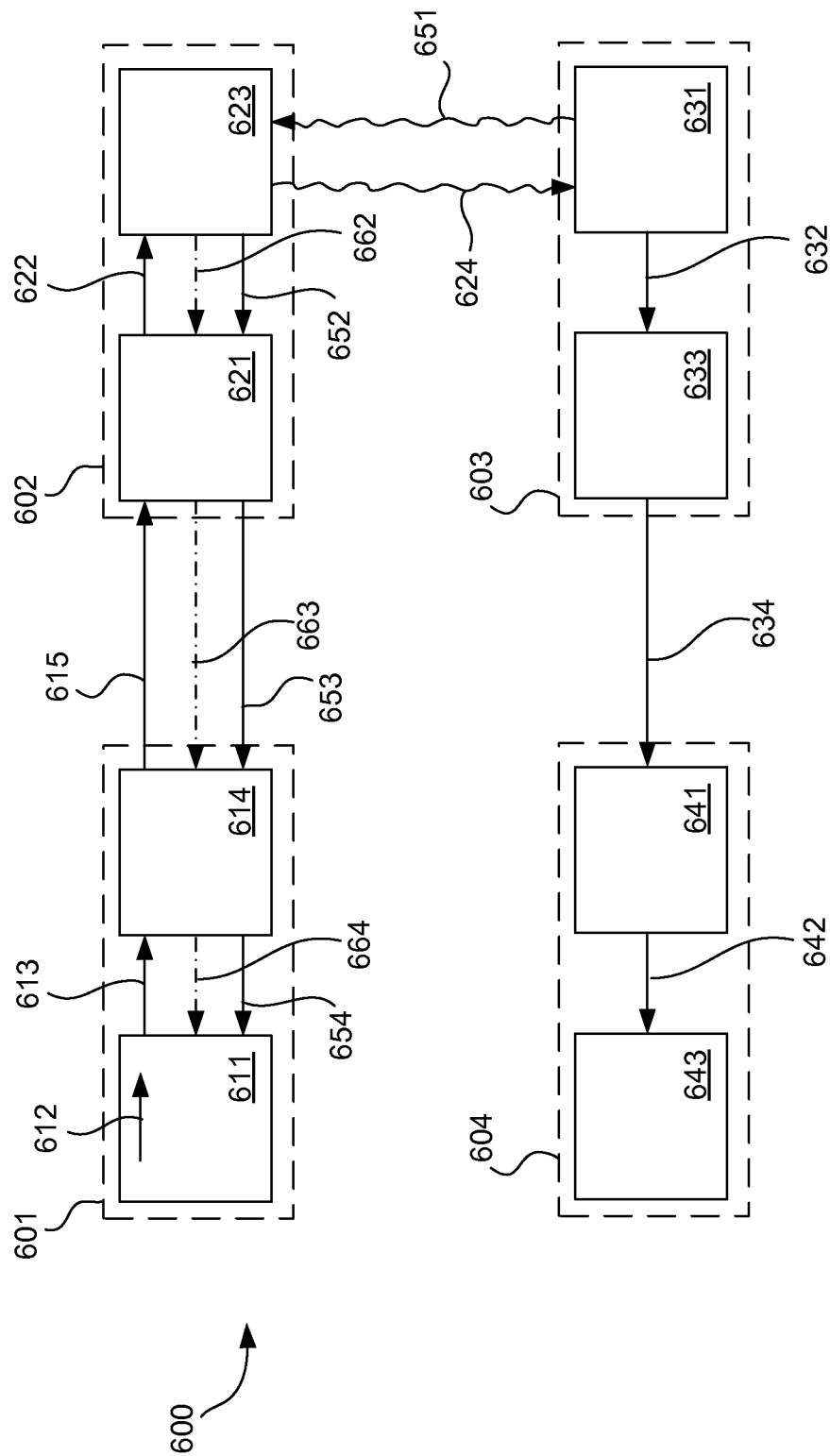
FIG. 6 illustrates one embodiment of a multimedia system employed to implement the invention.

FIG. 6 provides a generalized illustration of one multimedia wireless data transmission system 600. This illustration follows a simplified block diagram and describes but one of many possible implementations. To begin, a standard (non-wireless) source device 601 desires communication with another standard (non-wireless) sink device 604. In one embodiment, two non-wireless devices (e.g., 601, 604) are coupled with associated wireless interfaces (e.g., 602, 603) to enable wireless communication between source and sink. It is also pointed out that much of the functionality of wireless communication interface 602 can be integrated into source 601 as single device configured with wireless transmission and receiving circuitry. Conversely, much of the functionality of wireless communication interface 603 can be integrated into sink 604 as single device configured with wireless transmission and receiving circuitry. But as described here, the source 601 and sink 604 are in wireless communication via a wireless link between wireless interfaces 603, 604.

The principle is explained with reference to one specific embodiment, although many others are possible. In this embodiment, source data 612 is encoded as a packetized data stream (such as described earlier) by the source device 611. As such it can be transported from source 611 to transceiver 623 as a packetized data stream. It is then encoded as a wireless signal 624 that transmitted to the transceiver 631 of sink interface 603. Once received, the wireless signal 624 can be re-encoded as a packetized data stream that can be transported downstream from transceiver 631 to sink 643. The non-wireless connections between blocks (e.g., 611 and 614; 621 and 623; 631 and 633, 641 and 643) can comprise data linking units. Each having a main link as well as at least one sideband channel such as described above. However, alternative configurations can also be employed.

To continue, in this embodiment, a multimedia source device 601 receives or generates multimedia content 612 at a stream source 611. For example, such sink 611 can be a DVD player or anyone of a number of multimedia content sources known to those of ordinary skill in the art. The content 612 can be of any multimedia content format. Here, such is in a high-definition video content. The stream source converts the content 612 into a specified format which, by way of example, comprises a packetized data stream 613 such a described elsewhere. It is pointed out that other packetizing schemes can be used. This packetized data stream 613 is transported to a transceiver 614 using, for example, a main link of a data linking unit which can be configured as described herein-above. This signal 613 is output by transmitter 614 as a packetized data stream 615 (essentially the same as stream 613).

The signal 615 will be received at a wireless interface 602 which in this case converts the received signal 615 into a wireless multimedia signal 624. To begin, the receiver 621 receives the signal 615 and transports the signal as packetized data stream 622 to a wireless transceiver 623. In one implementation, the transport is achieved using a main link of a data linking unit which can be configured as described herein. The wireless transceiver 623 is configured to receive the packetized data stream 622 and encode it into a wireless transportable format which is output as multimedia wireless signal 624. It is pointed out that in one particularly advantageous embodiment, the functions of 621, 623 can be integrated into a single device. As such it can easily be configured as a system on a chip device.

The wireless signal 624 is received at a sink wireless interface 603 which in this case is configured to convert the received wireless multimedia signal 624 back, for example, into a packetized data stream (e.g., 632). Accordingly, the signal 624 is received by a wireless transceiver 631 (of the sink interface 603) and converted back into a packetized data stream 632 (for example, of a type described herein). The packetized data stream 632 is then transmitted to a transceiver 633 of the sink interface 603. For example, using a main link of a data linking unit such as described herein (as well as other possibilities).

The transceiver 633 receives the packetized data stream 632 and outputs the packetized data stream 634 from the interface where it can be received by the sink device 604. As indicated with respect to the source wireless interface 602, the functions of 631, 633 of the sink wireless interface can also be integrated into a single system on a chip configuration. To continue, the packetized data stream (here stream 634) is forwarded from the sink wireless interface 603 to a receiver 641 of the connected sink device 604. Once again, by way of example, such transport can be achieved using a main link of a data linking unit such as described herein (as well as other possibilities).

The packetized data stream is received at the transceiver 641 of the sink device 604. The packetized data stream is then forwarded 642 to a sink device 643 that can consume the data content 642 and/or forward it on to additional devices downstream. Also, the transceiver 641 can be configured to convert the packetized data 634 into a device native format (native to 643) which is forwarded 642 in native format for consumption at the sink 643.

The inventor points out, that although the invention is disclosed transporting the content as a packetized data stream for essentially its entire transport path (e.g., from 611 to 623 or from 631 to 643) apart from its wireless transmission 624, in some conditions this need not necessarily be true. For example, the signal traveling downstream can be in any format until it reaches 623 where it is converted to a packetized format (typically by 621) suitable for conversion to a wireless data stream 624. Also, for a signal traveling downstream, it can be in any format after it is converted from wireless format (at 631) to a packetized format. These details is all system and implementation specific.

In a useful attribute of the invention, the wireless connection 624 is monitored for quality of service conditions. As is well known, a large variety of quality of service monitoring methodologies are known and can be applied here. In one example, such quality of service monitoring can be conducted at 631 (other example implementations monitor at transmitter 623, or even further downstream at devices 603, 604). However, the invention will be discussed in terms of monitoring of the quality of service at the sink wireless interface device 603. By monitoring various wireless data transmission parameters (packet loss, bandwidth changes, etc.) quality of service information can be obtained regarding the virtual data channel between the sink device 604 and the originating source 601 (and in particular the wireless channel 624). However, in existing technologies, there was a limit as to what could be done with said quality of service information. At most, adjustments to the wireless transmitter 623 were all that could be done. This fails to capitalize on many attributes of modern multimedia systems. Accordingly, the inventor has enabled a way of transmitting quality of service information upstream from the source wireless interface 603 where it can be used at the originating source 601 (e.g., 611) to adjust the multimedia data transmission characteristics to accommodate changes in the wireless communication channel 624 (as well as other changes to the virtual channel between the source 601 and sink 604).

This attribute shall be explained with respect to a single embodiment. The inventor points out that many other modalities can be employed by the skilled man and are specifically contemplated as forming part of this disclosure. A QoS signal 651 can be provided by the sink interface wireless transceiver 631 to the source interface wireless transceiver 623. For example, the signal can be transmitted using a wireless side band frequency or any of a number of other methods known to persons of ordinary skill in the art. This signal 651 contains quality of service information associated with the wireless communication channel 624. Such information can include measures of lost packets, changing bandwidth, and so on. Such measures and methods of characterizing quality of service are well known to those of ordinary skill and need not be detailed here.

In typical systems, adjustments are made at the wireless transmitter 623 but go no further. Indeed in the current state of the art there is no method for transmitting quality of service information upstream (toward the content source 601, 611). In this embodiment, the quality of service information is transmitted upstream using a "wired" connection. In this example, a "wired" connection is to say non-wireless connection. In one implementation, the quality of service information is transmitted from 623 to 621 (as signal 652); from 621 to 614 (as signal 653); and from 614 to 611 (as signal 654). For example, using supplementary channels of the aforementioned data linking units. Alternative embodiments may simply include a quality of service line connected directly from the transceiver 623 to source 611. However, the depicted implementation works very well with existing implementations using the already existing data linking units. In one non-limiting example, using a DisplayPort compatible linking unit, the packetized data streams are transmitted downstream (toward the sink 604) using the main link and the quality of service information can be transmitted back upstream using, for example, the auxiliary line of the linking unit.

Also, as a specifically attractive enhancement, each upstream system (e.g., 621, 614, 611) can be alerted that there is downstream quality of service information available. For example, a hot plug detection line of the linking unit can be used to send a "quality of service alert" message to upstream systems to alert them to the presence of quality of service information. In one implementation, the alert message can simply be a hot plug IRQ message sent through the hot plug detect line forming a part of an ordinary data linking unit. Such an alert can be transmitted from 623 to 621 (as signal 662); from 621 to 614 (as signal 663); and from 614 to 611 (as signal 664). This alert message can enable the upstream systems to understand quality of service information is to be received. Also, the alert can initiate a process for acting upon it (e.g., passing the quality of service information further upstream and/or adjusting the system to accommodate changes in the channel 624 condition). In one particular embodiment, as discussed above, in response to the quality of service information, the source content originator 611 can adjust at least one of said source multimedia content 612 or said packetized data stream 613 in response to the quality of service information. As also indicated, refresh rates can be adjusted, resolution of the signal can be adjusted, packets can be selectively deleted from the data stream, and so on. Thus, the entire system becomes very responsive to changing wireless link conditions.

It should be noted that the many elements disclosed with respect to FIG. 6 can be comprised as a group of integrated circuit chips. Additionally, any or all of the various components can form part of a system on a chip configuration. Additionally, such components can operate a series of computer readable instructions configured to enable the components to function as indicated in this disclosure. Additionally, the inventor points out that such computer readable instructions and associated data structures and programs can be embodied as firmware resident on the devices described herein.

Although only a few embodiments of the present invention have been described, it should be understood that the present invention may be embodied in many other specific forms without departing from the spirit or the scope of the present invention. The present examples are to be considered as illustrative and not restrictive, and the invention is not to be limited to the details given herein, but may be modified within the scope of the appended claims along with their full scope of equivalents.

While this invention has been described in terms of a preferred embodiment, there are alterations, permutations, and equivalents that fall within the scope of this invention. It should also be noted that there are many alternative ways of implementing both the process and apparatus of the present invention. It is therefore intended that the invention be interpreted as including all such alterations, permutations, and equivalents as fall within the true spirit and scope of the present invention.

What is claimed is:

1. A multimedia data transmission apparatus, for use in a multimedia communication device, the apparatus comprising:
    a receiver suitable for receiving multimedia source input from a source;
    a data transmitter suitable for wirelessly transmitting said source input as a source output sent to a sink as a wireless signal establishing a data link between the source and sink;
    a quality of service receiver configured to wirelessly receive quality of service information from the sink concerning the data link; and
    a quality of service output for directing the quality of service information upstream toward the source.

2. The multimedia data transmission apparatus as recited in claim 1 wherein, the receiver comprises a means for receiving said source input;
    the data transmitter comprises a means for wirelessly transmitting said source output as a wireless signal;
    the quality of service receiver comprises means for wirelessly receiving said quality of service information from the sink; and the quality of service output comprises a means for outputting said quality of service information upstream.

3. The multimedia data transmission apparatus as recited in claim 1 wherein, the receiver comprises a physical interface arranged to enable the source input to be received using the physical interface.

4. The multimedia data transmission apparatus as recited in claim 3 wherein the apparatus converts the source input into the source output configured in a wireless compatible format suitable for transmission as the wireless signal.

5. The multimedia data transmission apparatus as recited in claim 4 wherein the source input comprises a packetized data stream.

6. The multimedia data transmission apparatus as recited in claim 5 wherein the source input comprises at least one source data stream and wherein the packetized data stream comprises a plurality transfer units with each transfer unit containing multimedia data from at least one of said at least one source data stream.

7. The multimedia data transmission apparatus as recited in claim 5 wherein the apparatus is configured to receive the source input as a plurality of source data streams and is adapted to multiplex said plurality of source data streams into a stream of transfer units configured such each transfer unit includes data from at least one of the plurality of source data streams to form the packetized data stream.

8. The multimedia data transmission apparatus as recited in claim 7 wherein the apparatus converts the packetized data stream into the wireless compatible source output.

9. The multimedia data transmission apparatus as recited in claim 1 wherein the receiver, multimedia data output, quality of service receiver, and quality of service output are arranged in a system on a chip configuration.

10. The multimedia data transmission apparatus as recited in claim 1 wherein the apparatus is incorporated onto a source device that generates the source input.

11. A multimedia source device configured to enable wireless transmission of multimedia source output to a sink using a wireless data link between source and sink, the device further configured to wirelessly receive quality of service information from the sink wherein said quality of service information is associated with the condition of the wireless data link, the source device further configured to enable adjustment of the source output to adapt to changes in the wireless data link.

12. The source device as recited in claim 11 comprising,
a processor for providing the source input;
a transmitter for wirelessly transmitting the source output as a wireless signal to the sink thereby establishing said wireless data link; and
a receiver suitable for receiving the quality of service information from the sink.

13. The source device as recited in claim 12
wherein the receiver is configured to receive the quality of service information concerning the condition of the wireless data link between source and sink; and
wherein the source device adjusts the source input to accommodate changes in the condition of the wireless data link.

14. The source device as recited in claim 13 wherein the processor enables adjustment of the source input to accommodate a deterioration of signal quality in the data link and also enables adjustments in the source input to accommodate improvement in signal quality in the data link.

15. The source device as recited in claim 14 wherein the processor comprises a means for adjusting the source input to accommodate the deterioration and the improvement of signal quality in the data link.

16. The source device as recited in claim 14 wherein when the link signal quality deteriorates, the processor enables adjustment of the source input to accommodate a deterioration of signal quality by performing at least one of altering a refresh rate in the source input, reducing a resolution of the source input, changing a format of the source input, increasing compression for the source input, or lowering a data rate in the wireless signal.

17. The source device as recited in claim 13 wherein the processor provides source input that comprises at least one source data stream and adjusts the source input to accommodate changes in the condition of the wireless data link.

18. The source device as recited in claim 13 further comprising a scheduler for multiplexing the at least one source data stream into a packetized source data stream that is received by the transmitter for wirelessly transmitting the packetized source data stream to the sink in a wireless compatible format.

19. The source device as recited in claim 18 wherein when the link signal quality deteriorates, at least one of the processor and the scheduler enable adjustment of the source input to accommodate a deterioration of signal quality.

20. The source device as recited in claim 19 wherein when the link signal quality deteriorates, at least one of the processor and the scheduler enable adjustment of the source input to accommodate a deterioration of signal quality by performing at least one of altering a refresh rate in the source input, reducing a resolution of the source input, changing a format of the source input, increasing compression for the source input, removing filler packets from the packetized data stream, deleting source data streams from the packetized data stream.

21. The source device as recited in claim 18 wherein the scheduler that multiplexes the at least one source data stream into the packetized source data stream generates packetized source data stream such that it comprises a stream of transfer units such that each packet unit includes data packets from at least one of said source data streams.

22. The source device as recited in claim 21 wherein each transfer unit includes attribute information that characterizes the packets with the transfer unit.

23. The source device as recited in claim 22 wherein the attribute information is removed from each transfer unit to form a stripped transfer unit, and wherein the source device transmits the removed attribute information to the sink device prior to transmitting the stripped transfer units enabling decoding of the stripped transfer units at the sink.

24. A multimedia data transmission apparatus, for use in a multimedia communication apparatus, wherein the apparatus is configured to wirelessly send source output to a sink as a wireless signal in a wireless data link between a source and the sink and wirelessly receive quality of service information from the sink concerning the data link and transmit the quality of service information upstream to said source thereby enabling the source to adjust source input to accommodate changes the wireless signal.

25. The multimedia data transmission apparatus as recited in claim 24, wherein the apparatus comprises, a receiver suitable for receiving the source input from a source;
a scheduler adapted to packetize the source input such that it forms a packetized data stream comprising a stream of transfer units;

an encoder for converting the packetized data stream into the source output having a wireless compatible transmission format;

a transmitter for wirelessly transmitting the source output as the wireless signal to a sink;

a quality of service receiver configured to wirelessly receive quality of service information concerning the data link; and a quality of service output for outputting said quality of service information upstream to said source.

26. The multimedia data transmission apparatus as recited in claim 25 wherein, the receiver comprises a means for receiving the source input;

the scheduler comprises a means for packetizing the source input;

the encoder comprises a means for converting the packetized data stream into the source output having a wireless compatible transmission format;

the transmitter comprises a means for wirelessly transmitting the source output;

the quality of service receiver comprises a means for wirelessly receiving the quality of service information; and the quality of service output comprises a means for outputting the quality of service information upstream.

27. The multimedia data transmission apparatus as recited in claim 26 wherein, source input received comprises a plurality of source data streams; and the scheduler packetizes the source data streams into the packetized data stream such that it comprises a stream of transfer units with each unit comprising packets from at least one of said plurality of source data streams.

28. The multimedia data transmission apparatus as recited in claim 27 wherein, at least some of the attribute information relevant to a decoding of the transfer units is removed from the transfer units of the stream of transfer units associated with the attribute information; and the attribute information and the associated stream of transfer units comprise the source output which is wirelessly transmitted to a sink device.

29. The multimedia data transmission apparatus as recited in claim 27 wherein, at least some of the attribute information relevant to a decoding of the transfer units is removed from the transfer units of the stream of transfer units associated with the attribute information; and the attribute information and the associated stream of transfer units comprise the source output which is wirelessly transmitted to a sink such that the attribute information is transmitted prior to the transmission of the associated stream of transfer units.

30. The multimedia data transmission apparatus as recited in claim 27 wherein, at least some of the attribute information relevant to a decoding of the transfer units is removed from the transfer units of the stream of transfer units associated with the attribute information;

the attribute information and the associated stream of transfer units comprise the source output;

the attribute information is wirelessly transmitted to a sink; and the associated stream of transfer units is wirelessly transmitted to the sink such that the device such that said stream of transfer units and said attribute information are transmitted separately.

31. A multimedia communication apparatus comprising, a receiver suitable for receiving a packetized source data stream associated with a source device;

a convertor unit for converting the packetized data stream into a source output having a wireless transmission format;

a transmitter for wirelessly transmitting the source output to a sink as a wireless signal over a wireless data link between the communication apparatus and the sink;

a quality of service receiver configured to wirelessly receive quality of service information concerning the quality of the data link; and a quality of service output for directing the received quality of service information upstream toward said source.

32. The multimedia communication apparatus recited in claim 31 wherein upon a change in said received quality of service information the apparatus provides an alert signal that is associated with a change in status of the quality of service information and directs the alert signal upstream toward said source.

33. The multimedia communication apparatus recited in claim 32 wherein the receiver receives the packetized source data stream through a main link in a communication channel and the quality of service information is directed upstream using a supplemental link in the communication channel.

34. A multimedia communication sink device suitable for receiving a wireless signal via a wireless data link between the sink and an associated source and monitoring the link such that wireless quality of service information concerning the link enabling the quality of service information to be wirelessly provided back to the source, the sink configured to enable translation of the wireless signal into a source packetized source data stream configured to enable adapting to changing characteristics of the packetized source data stream.

35. The sink device recited in claim 34 wherein, the sink comprises a receiver means for wirelessly receiving the wireless signal via the wireless data link;

the sink comprises a means for monitoring the link characteristics of the wireless data link to obtain the quality of service information;

the sink comprises a wireless means for wirelessly providing the quality of service information back to the source;

the sink comprises a means for translating the wireless signal into the packetized data stream; and the sink comprises a decoding means that enables adapting to changing characteristics of the packetized source data stream.

36. The sink device recited in claim 34 wherein the sink comprises a receiver suitable for wirelessly receiving the wireless signal using said data link;

comprises a convertor enabling the conversion of the wireless signal into the source packetized data stream; and enables adaptation to changes in the packetized source data stream to correctly decode the packetized source data stream.

37. The sink device recited in claim 34 wherein the sink is configured to receive a wireless signal that includes a stream of transfer units in the packetized data stream and configured to receive attribute information associated with stream of transfer units prior to receiving the associated stream of transfer units and wherein the sink enables the decoding of the associated stream of transfer units using the attribute information.

38. The sink device recited in claim 37 wherein,
the sink is configured to receive attribute information that is sent separately from and prior to the receipt of the associated transfer units;
the sink is configured to receive the packetized data stream with the attribute information substantially removed from each of transfer units associated with said attribute information; and
the sink is configured to reconstruct originating source input using the separately sent attribute information and the associated transfer units.

39. The sink device recited in claim 37 wherein,
the sink is configured to receive the packetized data stream with the attribute information substantially removed from packet headers of the transfer units associated with said attribute information;
the sink is configured to receive attribute information that is sent prior to the receipt of the associated transfer units and in portions of transfer units that do not contain multimedia data; and
the sink is configured to reconstruct originating source input using the attribute information and the associated transfer units.

40. A method for regulating multimedia data transmission, the method comprising:
establishing a wireless data link suitable for transmitting a wireless signal;
wirelessly transmitting source output as a wireless signal over the data link;
wirelessly receiving quality of service information concerning the condition of the data link; and
directing the source quality of service information upstream toward a source.

41. The method as recited in claim 40 further comprising:
configuring the source input as a packetized data stream containing a stream of transfer units; and
transforming the packetized data stream into the source output having a wireless data format.

42. The method as recited in claim 41 further comprising adjusting the packetized data stream based on the condition of the data link.

43. The method as recited in claim 42 wherein when the condition of the data link deteriorates said adjusting of the packetized data stream comprises reducing the amount of multimedia data contained in the data stream.

44. The method as recited in claim 42 wherein when the condition of the data link deteriorates said adjusting of the packetized data stream the comprises performing at least one of altering a refresh rate in the source input, reducing a resolution of the source input, changing a format of the source input, increasing compression for the source input, removing filler packets from the packetized data stream, deleting source data streams from the packetized data stream.

45. The method as recited in claim 42 wherein when the condition of the data link deteriorates said adjusting of the packetized data stream comprises deleting at least one of the source data streams from the packetized data stream.

46. The method as recited in claim 42 wherein when the condition of the data link deteriorates said adjusting of the packetized data stream further comprises increasing the size of payload in each transfer unit.

47. A non-transitory computer readable medium having a computer program executable by a processor for performing wireless transmission of multimedia data, the computer program comprising:
computer coded instructions for establishing a wireless data link suitable for transmitting a wireless signal;
computer coded instructions for wirelessly transmitting source output as a wireless signal over the data link;
computer coded instructions for wirelessly receiving quality of service information concerning the condition of the data link; and
computer coded instructions for outputting the quality of service output for directing the source quality of service information upstream toward a source.

* * * * *